US012752516B2

(12) United States Patent
Cleary et al.

(10) Patent No.: US 12,752,516 B2
(45) Date of Patent: Oct. 6, 2026

(54) LAMINATE WINDOWS FOR INFRARED SENSING SYSTEMS

(71) Applicant: CORNING INCORPORATED, Corning, NY (US)

(72) Inventors: Thomas Michael Cleary, Elmira, NY (US); William Keith Fisher, Corning, NY (US); Sang Ki Park, Painted Post, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 125 days.

(21) Appl. No.: 18/868,029

(22) PCT Filed: Jun. 2, 2023

(86) PCT No.: PCT/US2023/024256

§ 371 (c)(1),
(2) Date: Nov. 21, 2024

(87) PCT Pub. No.: WO2023/239600

PCT Pub. Date: Dec. 14, 2023

(65) Prior Publication Data

US 2026/0184047 A1 Jul. 2, 2026

Related U.S. Application Data

(60) Provisional application No. 63/349,764, filed on Jun. 7, 2022.

(51) Int. Cl.
*B32B 17/10* (2006.01)
*G01S 7/481* (2006.01)

(52) U.S. Cl.
CPC .. *B32B 17/10449* (2013.01); *B32B 17/10036* (2013.01); *B32B 17/10137* (2013.01);
(Continued)

(58) Field of Classification Search
None
See application file for complete search history.

(56) References Cited

U.S. PATENT DOCUMENTS 8,147,973 B2 4/2012 Greer et al.
11,401,210 B2 8/2022 Dejneka et al.
(Continued)

FOREIGN PATENT DOCUMENTS

WO 2020/214870 A1 10/2020
WO 2020/247245 A1 12/2020
(Continued)

OTHER PUBLICATIONS

Gross et al., "Crack-resistant glass with high shear band density", Journal of Non-Crystalline Solids, 494 (2018), pp. 13-20.
(Continued)

*Primary Examiner* — Marcus H Taningco
(74) *Attorney, Agent, or Firm* — Svetlana Z. Short

(57) ABSTRACT

Disclosed is a window for a sensing system comprising an asymmetric laminate structure. The asymmetric laminate structure comprises a first glass ply, a second glass ply, and an interlayer coupling the first glass ply to the second glass ply. The first glass ply is at least two times thicker than the second glass ply and is strengthened to a lesser extent than the second glass ply such that the first glass ply comprises a central tension in a central region thereof that is less than that of the second glass ply. The interlayer comprises an average optical transmission of greater than or equal to 98% throughout a 50 nm wavelength range of interest contained in the wavelength range of 800 nm to 1800 nm.

20 Claims, 8 Drawing Sheets

(52) U.S. Cl.
CPC ...... *B32B 17/10761* (2013.01); *G01S 7/4813* (2013.01); *B32B 2307/418* (2013.01); *B32B 2307/536* (2013.01); *B32B 2307/558* (2013.01); *B32B 2307/7376* (2023.05); *B32B 2457/00* (2013.01); *B32B 2605/00* (2013.01)

(56) References Cited

U.S. PATENT DOCUMENTS

| | | | |
|---|---|---|---|
| 11,912,010 | B2 | 2/2024 | Gorelchenko et al. |
| 11,951,713 | B2 | 4/2024 | Cleary et al. |
| 2012/0094084 | A1 | 4/2012 | Fisher et al. |
| 2017/0129218 | A1 | 5/2017 | Cleary et al. |
| 2019/0160787 | A1 | 5/2019 | Bartlow et al. |
| 2019/0358935 | A1* | 11/2019 | Mitamura ............... C03C 27/10 |
| 2020/0172428 | A1 | 6/2020 | Dejneka et al. |
| 2021/0039357 | A1* | 2/2021 | Nakamura ........ B32B 17/10449 |
| 2022/0317353 | A1* | 10/2022 | Hart ....................... G02B 1/115 |
| 2023/0173895 | A1 | 6/2023 | Cleary et al. |
| 2023/0415456 | A1 | 12/2023 | Akarapu et al. |
| 2024/0165919 | A1* | 5/2024 | Alonzo ............. G02F 1/133331 |
| 2025/0262842 | A1* | 8/2025 | Cleary .............. B32B 17/10036 |

FOREIGN PATENT DOCUMENTS

| | | | |
|---|---|---|---|
| WO | 2020/247292 | A1 | 12/2020 |
| WO | 2022/125422 | A1 | 6/2022 |
| WO | 2023/069262 | A1 | 4/2023 |
| WO | 2023/091305 | A1 | 5/2023 |
| WO | 2024/015094 | A2 | 1/2024 |
| WO | 2024/118320 | A1 | 6/2024 |

OTHER PUBLICATIONS

Gross, "Deformation and cracking behavior of glasses indented with diamond tips of various sharpness", Journal of Non-Crystalline Solids, 358 (2012), pp. 3445-3452.

Oliver et al., "An improved technique for determining hardness and elastic modulus using load and displacement sensing indentation experiments", J. Mater. Res., vol. 7, No. 6, 1992, pp. 1564-1583.

Oliver et al., "Measurement of Hardness and Elastic Modulus by Instrument Indentation: Advances in Understanding and Refinements to Methodology", J. Mater. Res., vol. 19, No. 1, 2004, pp. 3-20.

* cited by examiner

LAMINATE WINDOWS FOR INFRARED SENSING SYSTEMS

PRIORITY

This is a U.S. National Stage application under 35 U.S.C. § 371 of International Patent Application PCT/US2023/024256 filed on Jun. 2, 2023, which claims the benefit of priority under 35 U.S.C. § 119 of U.S. Provisional Application Ser. No. 63/349,764 filed on Jun. 7, 2022, the content of each of which is relied upon and incorporated herein by reference in its entirety.

BACKGROUND

Light detection and ranging ("LIDAR") systems include an electromagnetic radiation emitter and a sensor. The electromagnetic radiation emitter emits electromagnetic radiation, which may reflect off an object and be detected by the sensor. The electromagnetic radiation may be pulsed or otherwise distributed across a radial range to detect objects across a field of view. Information about the object can be deciphered from the properties of the detected reflected electromagnetic radiation. Distance of the object from the electromagnetic radiation can be determined from the time of flight from emission of the electromagnetic radiation to detection of the reflected electromagnetic radiation. If the object is moving, path and velocity of the object can be determined from shifts in radial position of the emitted electromagnetic radiation being reflected and detected as a function of time, as well as from Doppler frequency measurements.

LIDAR systems in automobiles, and other infrared sensing systems in exposed environments, such as aerospace or home security applications, need to be protected from the environment and various sources of damage, for example, with a covering lens or cover glass window. Vehicles are another potential application for LIDAR systems, with the LIDAR systems providing spatial mapping capability to enable assisted, semi-autonomous, or fully autonomous driving. In such applications, the electromagnetic radiation emitter and sensor are mounted on the roof of the vehicle or on a low forward portion of the vehicle. Electromagnetic radiation emitters emitting electromagnetic radiation having a wavelength outside the range of visible light, such as at 905 nm or 1550 nm are considered for vehicle LIDAR applications. To protect the electromagnetic radiation emitter and sensor from impact from rocks and other objects, a window is placed between the electromagnetic radiation emitter and sensor and the external environment in the line of sight of the electromagnetic radiation emitter and sensor. A window is similarly placed between the electromagnetic radiation emitter/sensor and the external environment for other applications of the LIDAR system, such as aerospace and home security applications. However, there is a problem in that rocks and other objects impacting the window scratch and cause other types of damage to the window, which cause the window to scatter the emitted and reflected electromagnetic radiation, thus impairing the effectiveness of the LIDAR system.

SUMMARY

The present disclosure solves that problem with a window having an asymmetric laminate structure that also provides suitable optical performance in a wavelength range of interest associated with a sensing system. The window comprises a first glass ply forming an exterior surface of the window facing the external environment, a second glass ply forming an interior surface facing components of the sensing system (e.g., an emitter and sensor), and an interlayer coupling the first glass ply to the second glass ply. The first glass ply is generally strengthened (e.g., thermally, mechanically, chemically) to a lesser extent than the second glass ply (e.g., the first glass ply may not be strengthened), such that the first glass ply generally comprises a central tension that is less than that of the second glass ply to resist crack propagation. The first glass ply comprises a first thickness that is greater than a second thickness associated with the second glass ply to improve impact resistance performance. The second glass ply may be chemically strengthened to aid in maintaining hermeticity in the event that an impact generates a flaw (e.g., crack, cavity, void) extending through the first glass ply. The interlayer is selected to adhere the first glass ply to the second glass ply with sufficient durability, while also providing relatively high optical transmission in a wavelength range of interest associated with the sensing system. In embodiments, the wavelength range of interest comprises a 50 nm wavelength range of interest that is contained in the wavelength range of 800 nm to 1800 nm. The laminates described herein provide improved impact performance over certain existing monolithic window structures, while also having optical transmission properties requisite for sensor applications.

An aspect (1) of the present disclosure pertains to a window for a sensing system comprising: a first glass ply comprising a first major surface, a second major surface that is opposite the first major surface, and a first thickness extending between the first major surface and the second major surface; a second glass ply comprising a third major surface, a fourth major surface that is opposite the third major surface, and a second thickness extending between the third major surface and the fourth major surface; an interlayer disposed between the first glass ply and the second glass ply and bonding the second major surface to the third major surface; and one or more layered films disposed on at least one of the first major surface and the fourth major surface, each of the one or more layered films comprising alternating layers of one or more higher refractive index materials and one or more lower refractive index materials, wherein: the interlayer, in isolation, comprises an average transmittance of greater than 98% over a 50 nm wavelength range of interest for light normally incident on the fourth major surface or the first major surface, the 50 nm wavelength range of interest is contained in a wavelength range of 800 nm to 1800 nm, the alternating layers of the one or more layered films are configured such that the window exhibits an average transmittance of greater than or equal to 95% over the 50 nm wavelength range of interest for light normally incident on the first major surface or the fourth major surface, the alternating layers of the one or more layered films are configured such that the window exhibits an average reflectance of less than or equal to 5% over the 50 nm wavelength range of interest for light normally incident on the first major surface or the fourth major surface, the first thickness is at least two times greater than the second thickness, and the second glass ply is strengthened to a greater extent than the first glass ply such that the second glass ply exhibits a central tension in a central region thereof that is greater than that of the first glass ply.

An aspect (2) of the present disclosure pertains to a window according to the aspect (1), wherein the first glass ply is unstrengthened.

An aspect (3) of the present disclosure pertains to a window according to any preceding aspect, wherein: the first thickness is greater than or equal to 2.0 mm and less than or equal to 8.0 mm, and the second thickness is greater than or equal to 0.1 mm and less than or equal to 1.2 mm.

An aspect (4) of the present disclosure pertains to a window according to any preceding aspect, wherein both the first glass ply and the second glass ply are formed of aluminosilicate glasses.

An aspect (5) of the present disclosure pertains to a window according to any of the aspects (1)-(3), wherein the first glass ply is formed from a glass that exhibits anomalous fracturing behavior when subjected to a Vickers indenter test.

An aspect (6) of the present disclosure pertains to a window according to the aspect (5), wherein the first glass ply comprises a borosilicate glass composition.

An aspect (7) of the present disclosure pertains to a window according to the aspect (6), wherein: in terms of constituent oxides, the borosilicate glass composition comprises: $SiO_2$, $B_2O_3$, $Al_2O_3$, one or more alkali metal oxides, and one or more divalent cation oxides selected from the group consisting of MgO, CaO, SrO, BaO, and ZnO, greater than or equal to 11 mol % and less than or equal to 16 mol % $B_2O_3$, greater than or equal to 2 mol % and less than or equal to 6 mol % $Al_2O_3$, and a total amount of $Na_2O$, $K_2O$, MgO, and CaO that is greater than or equal to 7.0 mol %, concentrations in mole percent on an oxide basis of $SiO_2$, $B_2O_3$, the one or more alkali metal oxides, $Al_2O_3$, and the one or more alkaline earth metal oxides, satisfy the relationships: $(R_2O+R'O) \geq Al_2O_3$, $0.80<(1-[(2R_2O+2R'O)/(SiO_2+2Al_2O_3+2B_2O_3)])<0.93$, and where $R_2O$ is the sum of the concentrations of the one or more alkali metal oxides and R'O is the sum of the concentrations of the one or more alkaline earth metal oxides.

An aspect (8) of the present disclosure pertains to a window according to any preceding aspect, wherein the first thickness is at least 3 times greater than the second thickness.

An aspect (9) of the present disclosure pertains to a window according to any preceding aspect, wherein the second glass ply is chemically strengthened such that the second glass ply comprises a surface compressive stress at the fourth major surface that is greater than or equal to 250 MPa and less than or equal to 900 MPa.

An aspect (10) of the present disclosure pertains to a window according to the aspect (9), wherein when the first glass ply is struck by a 1 g ball bearing travelling at 160.93 km/hr, a crack extending through the entire second thickness does not form.

An aspect (11) of the present disclosure pertains to a window according to any preceding aspect, wherein the interlayer comprises optically clear adhesive or a UV-curable acrylate resin.

An aspect (12) of the present disclosure pertains to a window according to the aspect (11), wherein the interlayer comprises a third thickness that is greater than or equal to 0.05 mm and less than or equal to 1.0 mm.

An aspect (13) of the present disclosure pertains to a window according to any of the aspects (1)-(12), wherein the 50 nm wavelength range of interest is centered at a wavelength between 900 nm and 950 nm.

An aspect (14) of the present disclosure pertains to a window according to any of the aspects (1)-(12), wherein the 50 nm wavelength range of interest is centered at a wavelength between 1525 nm and 1575 nm.

An aspect (15) of the present disclosure pertains to a window according to any preceding aspect, wherein: the one or more layered films comprise a first layered film disposed on the first major surface, and the window comprises a maximum hardness, measured at the first layered film and by the Berkovich Indenter Hardness Test, of at least 8 GPa.

An aspect (16) of the present disclosure pertains to a window according to the aspect (15), wherein: the one or more layered films comprise a second layered film disposed on the fourth major surface, and the quantity, the thicknesses, number, and materials of the alternating layers of the first and second layered films are configured so that the window has: an average reflectance, calculated over the 50 nm wavelength range of interest between 1400 nm and 1600 nm, of less than 0.5% for light incident on the first surface and the second surface at angles of less than or equal to 15°; a CIELAB L* value of less than or equal to 45 for angles of incidence of less than or equal to 60° on the first layered film; and CIELAB a* and b* values of greater than or equal to −6.0 and less than or equal to 6.0 when viewed from a side of the first layered film.

An aspect (17) of the present disclosure pertains to a window according to the aspect (16), wherein: one of the alternating layers of the first layered film that is farthest from the first major surface forms a terminal surface material of the window, the terminal surface material of the window comprising the lower refractive index material, and the first layered firm comprises a scratch resistant layer formed of one of the one or more higher refractive index materials and having a thickness that is greater than or equal to 1500 nm and less than or equal to 5000 nm.

An aspect (18) of the present disclosure pertains to a window according to the aspect (17), wherein: the scratch resistant layer is separated from the terminal surface by a plurality of the alternating layers of the one or more lower index materials and the one or more higher index materials of the first layered film, and the scratch resistant layer is separated from the terminal surface by at least 1000 nm.

An aspect (19) of the present disclosure pertains to a window according to the aspect (15), wherein: the one or more layered films comprise a second layered film disposed on the fourth major surface, and the quantity, the thicknesses, and materials of the alternating layers of the first and second layered films are configured so that the window has: an average percentage transmittance, calculated over the 50 nm wavelength range of interest, of greater than 90% for light incident on the first surface and the second surface at angles of incidence of less than or equal to 15°; an average reflectance, calculated over the 50 nm wavelength range of interest, of less than 0.5% for light incident on the first surface and the second surface at angles of less than or equal to 15°; and an average percentage transmission, calculated from 400 nm to 700 nm, of greater than 80% for light incident on the first surface and the second surface at angles of incidence of less than or equal to 15°.

An aspect (20) of the present disclosure pertains to a window for a sensing system comprising: a first glass ply comprising a first major surface, a second major surface that is opposite the first major surface, and a first thickness extending between the first major surface and the second major surface; a second glass ply comprising a third major surface, a fourth major surface that is opposite the third major surface, and a second thickness extending between the third major surface and the fourth major surface; an interlayer disposed between the first glass ply and the second glass ply and bonding the second major surface to the third major surface; and one or more layered films disposed on at least one of the first major surface and the fourth major surface, each of the one or more layered films comprising alternating layers of one or more higher refractive index materials and one or more lower refractive index materials, wherein: the first glass ply, the second glass ply, and the interlayer, in combination, without the one or more layered films, comprise an average transmittance of greater than 90% over a 50 nm wavelength range of interest, the 50 nm wavelength range of interest is contained in a wavelength range of 800 nm to 1800 nm, the alternating layers of the one or more layered films are configured such that the window exhibits an average transmittance of greater than or equal to 95% over the 50 nm wavelength range of interest for light normally incident on the first major surface or the fourth major surface, the alternating layers of the one or more layered films are configured such that the window exhibits an average reflectance of less than or equal to 5% over the 50 nm wavelength range of interest for light normally incident on the first major surface or the fourth major surface, the first thickness is at least two times greater than the second thickness, and the second glass ply is strengthened to a greater extent than the first glass ply such that the second glass ply exhibits a central tension in a central region thereof that is greater than that of the first glass ply.

An aspect (21) of the present disclosure pertains to a window according to the aspect (20), wherein the first glass ply is unstrengthened.

An aspect (22) of the present disclosure pertains to a window according to any of the aspects (20)-(21), wherein: the first thickness is greater than or equal to 2.0 mm and less than or equal to 8.0 mm, and the second thickness is greater than or equal to 0.1 mm and less than or equal to 1.2 mm.

An aspect (23) of the present disclosure pertains to a window according to any of the aspects (20)-(22), wherein both the first glass ply and the second glass ply are formed of aluminosilicate glasses.

An aspect (24) of the present disclosure pertains to a window according to any one of the aspects (20)-(23), wherein the first glass ply is formed from a glass that exhibits anomalous fracturing behavior when subjected to a Vickers indenter test.

An aspect (25) of the present disclosure pertains to a window according to the aspect (24), wherein the first glass ply comprises a borosilicate glass composition.

An aspect (26) of the present disclosure pertains to a window according to the aspect (25), wherein: in terms of constituent oxides, the borosilicate glass composition comprises: $SiO_2$, $B_2O_3$, $Al_2O_3$, one or more alkali metal oxides, and one or more divalent cation oxides selected from the group consisting of MgO, CaO, SrO, BaO, and ZnO, greater than or equal to 11 mol % and less than or equal to 16 mol % $B_2O_3$, greater than or equal to 2 mol % and less than or equal to 6 mol % $Al_2O_3$, and a total amount of $Na_2O$, $K_2O$, MgO, and CaO that is greater than or equal to 7.0 mol %, concentrations in mole percent on an oxide basis of $SiO_2$, $B_2O_3$, the one or more alkali metal oxides, $Al_2O_3$, and the one or more alkaline earth metal oxides, satisfy the relationships: $(R_2O+R'O) \geq Al_2O_3$, and $0.80<(1-[(2R_2O+2R'O)/(SiO_2+2Al_2O_{3+2}B_2O_3)])<0.93$, where $R_2O$ is the sum of the concentrations of the one or more alkali metal oxides and R'O is the sum of the concentrations of the one or more alkaline earth metal oxides.

An aspect (27) of the present disclosure pertains to a window according to any of the aspects (20)-(26), wherein the first thickness is at least 3 times greater than the second thickness.

An aspect (28) of the present disclosure pertains to a window according to any one of the aspects (20)-(27), wherein the second glass ply is chemically strengthened such that the second glass ply comprises a surface compressive stress at the fourth major surface that is greater than or equal to 250 MPa and less than or equal to 900 MPa.

An aspect (29) of the present disclosure pertains to a window according to the aspect (28), wherein when the first glass ply is struck by a 1 g ball bearing travelling at 160.93 km/hr, a crack extending through the entire second thickness does not form.

An aspect (30) of the present disclosure pertains to a window according to any of the aspects (20)-(29), wherein the interlayer comprises optically clear adhesive or a UV-curable acrylate resin.

An aspect (31) of the present disclosure pertains to a window according to the aspect (30), wherein the interlayer comprises a third thickness that is greater than or equal to 0.05 mm and less than or equal to 1.0 mm.

An aspect (32) of the present disclosure pertains to a window according to any of the aspects (20)-(31), wherein the 50 nm wavelength range of interest is centered at a wavelength between 900 nm and 950 nm.

An aspect (33) of the present disclosure pertains to a window according to any of the aspects (20)-(31), wherein the 50 nm wavelength range of interest is centered at a wavelength between 1525 nm and 1575 nm.

An aspect (34) of the present disclosure pertains to a window according to any of the aspects (20)-(33), wherein: the one or more layered films comprise a first layered film disposed on the first major surface, and the window comprises a maximum hardness, measured at the first layered film and by the Berkovich Indenter Hardness Test, of at least 8 GPa.

An aspect (35) of the present disclosure pertains to a window according to the aspect (34), wherein: the one or more layered films comprise a second layered film disposed on the fourth major surface, and the quantity, the thicknesses, number, and materials of the alternating layers of the first and second layered films are configured so that the window has: an average reflectance, calculated over the 50 nm wavelength range of interest between 1400 nm and 1600 nm, of less than 0.5% for light incident on the first surface and the second surface at angles of less than or equal to 15°; a CIELAB L* value of less than or equal to 45 for angles of incidence of less than or equal to 60° on the first layered film; and CIELAB a* and b* values of greater than or equal to −6.0 and less than or equal to 6.0 when viewed from a side of the first layered film.

An aspect (36) of the present disclosure pertains to a window according to the aspect (35), wherein: one of the alternating layers of the first layered film that is farthest from the first major surface forms a terminal surface material of the window, the terminal surface material of the window comprising the lower refractive index material, and the first layered firm comprises a scratch resistant layer formed of one of the one or more higher refractive index materials and having a thickness that is greater than or equal to 1500 nm and less than or equal to 5000 nm.

An aspect (37) of the present disclosure pertains to a window according to the aspect (36), wherein: the scratch resistant layer is separated from the terminal surface by a plurality of the alternating layers of the one or more lower index materials and the one or more higher index materials of the first layered film, and the scratch resistant layer is separated from the terminal surface by at least 1000 nm.

An aspect (38) of the present disclosure pertains to a window according to the aspect (34), wherein: the one or more layered films comprise a second layered film disposed on the fourth major surface, and wherein the quantity, the thicknesses, and materials of the alternating layers of the first and second layered films are configured so that the window has: an average percentage transmittance, calculated over the 50 nm wavelength range of interest, of greater than 90% for light incident on the first surface and the second surface at angles of incidence of less than or equal to 15°; an average reflectance, calculated over the 50 nm wavelength range of interest, of less than 0.5% for light incident on the first surface and the second surface at angles of less than or equal to 15°; and an average percentage transmission, calculated from 400 nm to 700 nm, of greater than 80% for light incident on the first surface and the second surface at angles of incidence of less than or equal to 15°.

An aspect (39) of the present disclosure pertains to a sensor system comprising: an emitter emitting radiation in a 50 nm wavelength range of interest, the 50 nm wavelength range of interest being contained in the wavelength range from 800 nm to 1800 nm; a sensor configured to detect the radiation emitted by the emitter; an enclosure defining a sensor cavity, wherein the emitter and sensor are contained in the sensor cavity, and a window according to any one of the aspects (21)-(38), wherein the window is attached to enclosure to hermetically seal the sensor cavity.

An aspect (40) of the present disclosure pertains to a sensor system according to the aspect (39), wherein the second glass ply comprises a dimension that is greater than that of the first glass ply and the second glass ply is attached to the enclosure such that the first major surface lies flush with a front surface of the enclosure.

An aspect (41) of the present disclosure pertains to a sensor system according to the aspect (40), wherein the sensor cavity remains hermetically sealed after the window is struck with a 1 g ball bearing travelling at 160.9 s km/hr at an angle of incidence of 45°.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
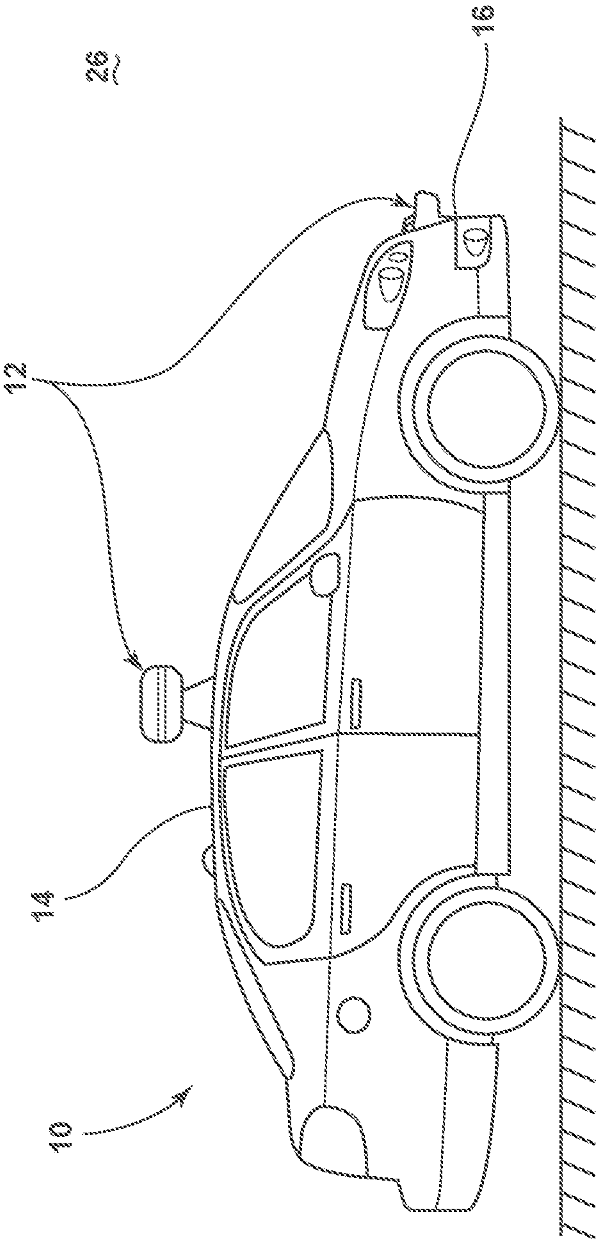
FIG. 1 is a side view of a vehicle in an external environment, illustrating a LIDAR system on a roof of the vehicle and another LIDAR system on a forward portion of the vehicle, according to one or more embodiments of the present disclosure.

Reference will now be made in detail to embodiments of windows for use in infrared sensing applications, such as in LIDAR sensors. Whenever possible, the same reference numerals will be used throughout the drawings to refer to the same or like parts. The windows described herein comprise asymmetric laminates comprising a first glass ply, a second glass ply, and an interlayer coupling the first glass ply to the second glass ply. The first glass ply comprises a first thickness and forms an outer surface of the window facing an external environment of the sensor when the window is installed on an enclosure. The second glass ply comprises a second thickness and forms an inner surface of the window facing other components of the sensor (e.g., an emitter and a detector) when the window is installed on the enclosure. The first thickness is substantially greater (e.g., at least 2.0 times greater, at least 2.5 times greater, at least 3.0 times greater, at least 3.5 times greater, at least 4.0 times greater, at least 4.5 times greater, at least 5.0 times greater) than the second thickness. In embodiments, the first glass ply is strengthened (e.g., thermally, chemically, or mechanically strengthened) to a lesser extent than the second glass ply such that the second glass ply exhibits a central tension in a central region thereof that is greater than that of the first glass ply. The second glass ply also exhibits compressive stress extending from major surfaces thereof to the central region to provide impact resistance and mechanical strength. Coupling between the first and second glass plies via the interlayer described herein may also aid in dissipating energy from impact events, as the interlayer layer may absorb energy from impacts and dissipate energy and render crack propagation less likely.

The asymmetric laminate structures of the windows described herein address various failure mechanisms associated with vehicle mounted sensor systems. A common cause of window failure in vehicle-mounted sensor systems is damage due to stone impacts. Stone impacts can cause fracture of windows via several mechanisms including blunt (Hertzian) contact, sharp contact, and flexure. Blunt contact creates a ring/cone crack that initiates from an existing flaw on the external surface and then propagates through the thickness of the window. Sharp contact creates damage that propagates through the thickness of the window and then creates radial/median cracks, and flexure of the window activates existing flaws. Flexure may expand existing flaws on the window, causing failure. The asymmetric laminate structure of the windows described herein beneficially addresses all three of these fracture-causing mechanisms. The increased thickness of the first glass ply, for example, increases the distance that sharp impact damage must propagate before creating radial/median fractures, thus rendering such fractures less likely. The relatively high strengthening of the second glass ply provides high flexural strength, rendering flexural failure less likely. The low central tension in the first glass ply also aids in resisting crack propagation of flaws from subsurface damage by lowering the crack-propagation energy stored in the glass. As a result, the asymmetric laminate structures of the windows described herein render fracture and crack propagation from various flaws less likely, thereby improving the longevity and reliability of vehicle-mounted sensor systems.

As described herein, the windows described herein exhibit greater impact resistance than certain existing monolithic glass plies having the same or even greater thicknesses. Such impact resistance renders fracture and crack propagation in either the first glass ply or the second glass ply less likely. Such durability is particularly advantageous in sensor applications, as radial/mean cracks in either of the glass plies may scatter light propagating through the window (e.g., from an emitter associated with the sensor) and negatively effect sensor performance. Moreover, in certain sensors, such as LiDAR sensors, sensor components may be housed in a hermetically sealed sensor cavity to provide reliable performance over the use lifetime of the sensor. The improved impact resistance of the windows described herein beneficially aids in maintaining the hermeticity of the sensor cavity even when the window is subjected to relatively severe impact events. As described herein, the windows according to the present disclosure may maintain hermeticity of a sensor cavity when the first glass ply is struck by a 1 g ball bearing travelling at 160.93 km/hr at a 45° angle. Existing monolithic windows may fail to maintain hermeticity for impacts at half of this speed even when having greater thicknesses than the windows described herein. Thickness reduction may further enhance impact performance by dissipating energy through deflection.

The materials of each component of the windows described herein may also be selected to favorably impact durability and impact resistance. For example, in embodiments, the first glass ply is constructed of a glass tending to exhibit anomalous cracking behavior when contacted with a Vickers indenter, as described herein. Such glass are resistant to median/radial crack propagation and tend to maintain damage from impact events in regions proximate to the point of initial impact, thereby minimizing detrimental optical effects. Additionally, the inner glass ply may be formed of a chemically strengthenable glass (e.g., an alkali-aluminosilicate glass, an alkali-aluminoborosilicate glass) to provide relatively high amounts of compressive stress at major surfaces thereof (e.g., at least 250 MPa) to provide high surface and flexural strength.

Materials for each of the components of the asymmetric laminate structures described herein are also selected to exhibit favorable optical performance in a wavelength range of interest associated with a sensor. For example, in embodiments, both the first and second glass plies may be formed of glasses exhibiting relatively high optical transmission (e.g., average transmittances of greater than or equal to 95%) over a 50 nm wavelength range of interest associated with a particular sensor application. The 50 nm wavelength range of interest may be contained in the wavelength range of 800 nm to 1800 nm (e.g., the 50 nm wavelength range of interest may comprise a center wavelength ranging from 925 nm to 975 nm or 1525 nm to 1725 nm).

The interlayer material may also be selected to have an average transmittance, in isolation (e.g., excluding the other components of the window), of greater than or equal to 98% (e.g., greater than or equal to 98.25%, greater than or equal to 98.5%, greater than or equal to 98.75%, greater than or equal to 99.0%, greater than or equal to 99.25%) over the 50 nm wavelength range of interest. As a result, the first glass ply, the second glass ply, and the interlayer, in combination (without any additional layered films/coatings), may exhibit an average transmittance of greater than 90% (e.g., greater than or equal to 90.25%, greater than or equal to 90.5%, greater than or equal to 90.75%, greater than or equal to 91.0%, greater than or equal to 91.25%) over the 50 nm wavelength range of interest. Such optical performance is superior than that obtainable when using typical polymer interlayers (such as polyvinyl butyral interlayers) to assemble glass laminates. In embodiments, the interlayer comprises a 0.05 mm to 1.5 mm thick layer of an optically clear adhesive or a UV-curable acrylate resin. Such materials provide the aforementioned optical performance while reliably coupling the glass plies to one another.

Optical performance attributes of the windows described herein may also be enhanced by including one or more layered films on major surfaces of the first and second glass plies. In embodiments, for example, the windows described herein may include first and second layered films disposed on the first glass ply and second glass ply, respectively, that are constructed of alternating layers of higher and lower refractive index materials and configured to provide relatively high transmittance and low reflectance in the 50 nm wavelength range of interest. When the window is installed in a LIDAR system, the first layered film may face away from the sensor/electromagnetic radiation emitter and be exposed to an external environment, while the second layered film may face the sensor/electromagnetic radiation emitter. That is, when the LIDAR system is viewed from the outside, an observer may view the first layered film. Light emitted by the electromagnetic radiation emitter may be initially incident on the second layered film prior to propagating through the substrate. In accordance with the present disclosure, the first layered films of the windows described herein may include one or more scratch resistant layers that are relatively thick (e.g., greater than or equal to 500 nm) of a high refractive index material. The scratch resistant layer may be embedded within the first layered film such that the window comprises a maximum nanoindentation hardness of greater than or equal to 8 GPa (e.g., greater than or equal to 10 GPa, greater than or equal to 12 GPa, greater than or equal to 14 GPa) when measured at the first layered film by the Berkovich Indenter Hardness Test. Such nanoindentation hardness beneficially provides scratch resistance and improves performance of the LIDAR system.

In aspects, the alternating layers of the first and second layered films of the windows described herein are also constructed to provide optical performance attributes that are desirable for operation of the LIDAR system in the infrared spectrum. In embodiments, the quantity, the thicknesses, number, and materials of the alternating layers of the first and second layered films are configured so that the window has an average percentage transmittance, calculated over the 50 nm wavelength range of greater than or equal to 95% for light that is normally incident the window. The quantity, the thicknesses, number, and materials of the alternating layers of the first and second layered films may be configured so that the window also comprises an average reflectance over the 50 nm wavelength range of interest of less than or equal to for light normally incident on the window.

As such, the windows described herein, by containing an asymmetric laminate structure, combined with at least one layered film comprising a scratch resistant layer on the first glass ply, may provide improved puncture and scratch resistance performance, thereby improving longevity and reliability of vehicle-based sensing systems to a significant extent, while providing favorable optical performance characteristics in a desired wavelength range of interest.

Unless otherwise noted, the total, specular, and average reflectance values provided herein are two-surface reflectance values, representing a total reflectance of an entire window, including the reflectance associated with each material interface in the window (e.g, between air and the layered films, between the layered films and the substrate, etc.). Unless otherwise noted, reflectance values provided in the infrared are measured from the side of the second layered film described herein (e.g., from the side positioned facing a sensor and emitter of a LIDAR system) and reflectance values provided in the visible are measured from the side of the first layered film described herein (e.g., from the side positioned facing an external environment of a LIDAR system).

Unless otherwise specified herein, average transmittance and reflectance values are calculated using percentage reflectance and transmittance values at various wavelengths within a specified wavelength range. Average reflectance and transmittance values may be calculated by measuring reflectance and transmittance values at every fifth whole number wavelength (including the endpoints) within a desired wavelength range, and averaging those values (e.g., when calculating an average transmittance over a wavelength range of 1540 nm to 1560 nm, transmittance values may be measured at 1540 nm, 1545 nm, 1550 nm, 1550 nm, and 1560 nm and averaged).

Unless otherwise noted herein, CIELAB color space a* and b* and lightness L* values are measured/simulated using a D65 illuminate.

As used herein, the terms "dark appearance" or "black appearance" refer to the reflected appearance of the window when viewed from an external surface. Windows having a dark appearance or black appearance in accordance with the present disclosure comprise CIELAB lightness L* values of less than 45 when viewed from angles 60° or less.

As used herein, the term "strengthened," when used in reference to a glass ply or glass layer, refers to glass substrates that may be strengthened chemically, mechanically, thermally or by various combinations of chemically, mechanically and/or thermally, to impart a compressive stress region with a surface compressive stress value, and a central tension region with a maximum CT value. Such strengthened glass substrates also include corresponding surface CS, and a compressive stress region that extends from a surface to a DOC). Any one or more of the magnitude of the surface CS, the DOC, and the magnitude of the maximum CT value can be tailored by the strengthening process. As used herein, DOC refers to the depth at which the stress transitions from compressive to tensile. Unless otherwise specified, CT and CS are expressed herein in megaPascals (MPa), whereas thickness and DOC are expressed in millimeters or microns.

CS and DOC are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

When FSM is used to measure the compressive stress, the CS is related to the CT by the following approximate relationship (Equation 1): $CT \approx (CS \times DOC)/(\text{thickness} - 2 \times DOC)$, where thickness is the total thickness of the strengthened glass substrate. A mechanically-strengthened glass substrate may include a compressive stress region and a central tension region generated by a mismatch of the coefficient of thermal expansion between portions of the substrate. A chemically-strengthened glass substrate may include a compressive stress region and a central tension region generated by an ion exchange process. In a chemically strengthened glass substrate, the replacement of smaller ions by larger ions at a temperature below that at which the glass network can relax produces a distribution of ions across the surface of the glass that results in a stress profile. The larger volume of the incoming ion produces a CS on the surface portion of the substrate and tension (CT) in the center of the glass. In a thermally-strengthened substrate, the CS region is formed by heating the substrate to an elevated temperature above the glass transition temperature, near the glass softening point, and then cooling the glass surface regions more rapidly than the inner regions of the glass. The differential cooling rates between the surface regions and the inner regions generates a residual surface CS, which in turn generates a corresponding CT in the center region of the glass.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The term "disposed" is used herein to refer to a layer or sub-layer that is coated, deposited, formed, or otherwise provided onto a surface. The term disposed can include layers/sub-layers provided in direct contact with adjacent layers/sub-layers or layers/sub-layers separated by intervening material which may or may not form a layer.

Referring now to FIG. 1, a vehicle 10 includes one or more LIDAR systems 12. The one or more LIDAR systems 12 can be disposed anywhere on or within the vehicle 10. For example, the one or more LIDAR systems 12 can be disposed on a roof 14 of the vehicle 10 and/or a forward portion 16 of the vehicle 10.

Figure 2:
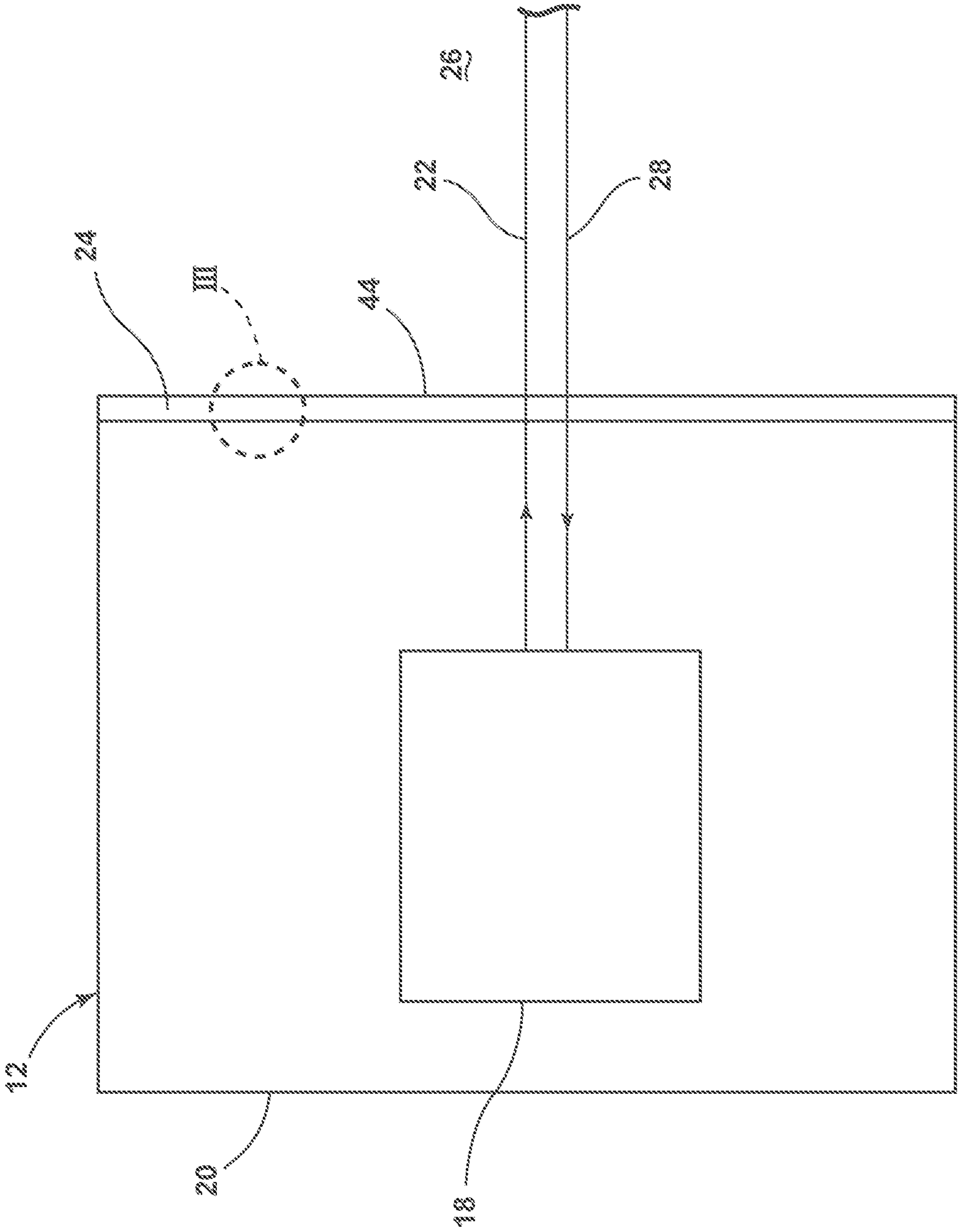
FIG. 2 is a schematic view of one of the LIDAR systems of FIG. 1, illustrating an electromagnetic radiation emitter and sensor in an enclosure, and the electromagnetic radiation emitter and sensor emitting electromagnetic radiation that exits the enclosure through a window and returns as reflected radiation through the window, according to one or more embodiments of the present disclosure.

Referring now to FIG. 2, each of the one or more LIDAR systems 12 include an electromagnetic radiation emitter and sensor 18, as known in the art, which may be enclosed in an enclosure 20. The enclosure 20 may be a housing formed of a suitable material (e.g., metallic or polymer-based material) that protects the radiation emitter and sensor 18 from the external environment 26. The LIDAR systems 12 further include a window 24 attached to the enclosure 20 to form a sensor cavity 15. In embodiments, the window 24 is attached to the enclosure 20 such that the sensor cavity 15 is hermetically sealed to prevent particles or other debris from the external environment from entering the sensor cavity 15 and degrading performance of the LIDAR systems 12. The window 24 may be coupled to the enclosure 20 using any suitable connection method. In embodiments, the window 24 is attached to front surfaces (e.g., of sidewalls) of the enclosure 20 using a suitable adhesive. In embodiments, the window 24 is attached to the enclosure 20 via one or more fasteners extending through at least one glass layer (e.g., an unstrengthened first glass ply, as described herein). In embodiments, one or more layers of an asymmetric laminate described herein may have different dimensions to facilitate attachment of the window 24 to the enclosure 20. For example, a first, outer glass ply may have dimensions that are smaller than that of a second, inner glass ply, and the window 24 may be bezel mounted in the enclosure 20 such that an outer surface of the window 24 is mounted flush with a front surface of the enclosure. Any suitable connection method may be used.

In embodiments, the electromagnetic radiation emitter and sensor 18 emits emitted radiation 22 having a wavelength or range of wavelengths (e.g., within a 50 nm wavelength range of interest contained in the wavelength range of 800 nm to 1800 nm). The emitted radiation 22 exits the enclosure 20 through the window 24, which is in the path of the emitted electromagnetic radiation. If an object (not illustrated) in an external environment 26 is in the path of the emitted radiation 22, the emitted radiation 22 will reflect off of the object and return to the electromagnetic radiation emitter and sensor 18 as reflected radiation 28. The reflected radiation 28 again passes through the window 24 to reach the electromagnetic radiation emitter and sensor 18. In embodiments, the emitted radiation 22 and the reflected radiation 28 may include light within a suitable wavelength range of interest from 800 nm to 1800 nm. For example, the emitted radiation 22 and reflected radiation 28 may be in a suitable 50 nm wavelength range. The 50 nm wavelength range may have a center wavelength (e.g., a wavelength of maximum intensity of the emitted radiation 22) that may vary depending on the application. The center wavelengths may be greater than or equal to 925 nm and less than or equal to 975 nm and greater than or equal to 1525 nm and less than or equal to 1575 nm in some embodiments. In embodiments, for, in the emitted radiation 22 and reflected radiation 28 may be greater than or equal to 1400 nm and less than or equal to 1600 nm (e.g., greater than or equal to 1500 nm and less than or equal to 1600 nm, greater than or equal to 1525 nm and less than or equal to 1575 nm, approximately 1550 nm, 1550 nm). Electromagnetic radiation other than the reflected radiation 28 (such as electromagnetic radiation having wavelengths in the visible spectrum, portions of the ultraviolet range) may also interact with the window 24. As described herein, the window 24 may be designed to provide desired performance attributes over such wavelength ranges via incorporating one or more layered films.

As described herein, the "visible spectrum" is the portion of the electromagnetic spectrum that is visible to the human eye and generally refers to electromagnetic radiation having a wavelength within the range of about 380 nm or 400 nm to about 700 nm. The "ultraviolet range" is the portion of the electromagnetic spectrum having wavelengths between about 10 nm and about 400 nm. The "infrared range" of the electromagnetic spectrum begins at about 700 nm and extends to longer wavelengths. The sun generates solar electromagnetic radiation, commonly referred to as "sunlight," having wavelengths that fall within all three of those ranges.

Figure 3A:
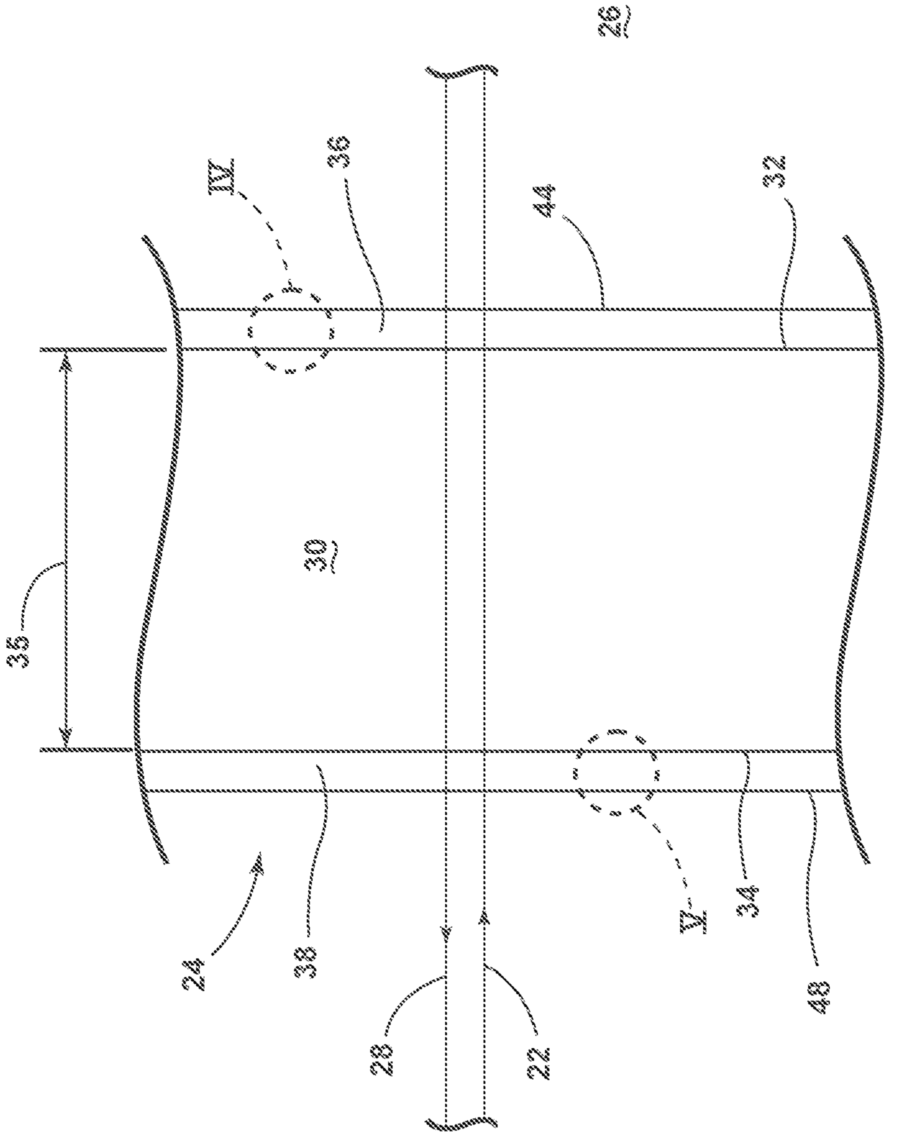
FIG. 3A is a cross-sectional view of the window of FIG. 2 taken at area III of FIG. 2, illustrating the window including a substrate with a layered film over a first surface of the substrate, and a second layered film over a second surface of the substrate, according to one or more embodiments of the present disclosure.

Referring now to FIG. 3A, the window 24 for each of the one or more LIDAR systems 12 includes a substrate 30. The substrate 30 includes a first surface 32 and a second surface 34. The first surface 32 and the second surface 34 are the primary surfaces of the substrate 30. The first surface 32 is closest to the external environment 26. The second surface 34 is closest to the electromagnetic radiation emitter and sensor 18. The emitted radiation 22 encounters the second surface 34 before the first surface 32. The reflected radiation 28 encounters the first surface 32 before the second surface 34. The substrate 30 further includes a first layered film 36 disposed on the first surface 32 of the substrate 30 and (optionally) a second layered film 38 is disposed on the second surface 34 of the substrate 30. Examples are described herein where the window 24 includes both the first layered film 36 and the second layered film 38. Embodiments are also envisioned where the window 24 includes only one layered film (e.g., only the first layered film 36 or the second layered film 38). It should be understood that the window 24 as described herein is not limited to vehicular applications, and can be used for whatever application the window 24 would be useful to provide improved impact and optical performance, as described further herein.

Figure 3B:
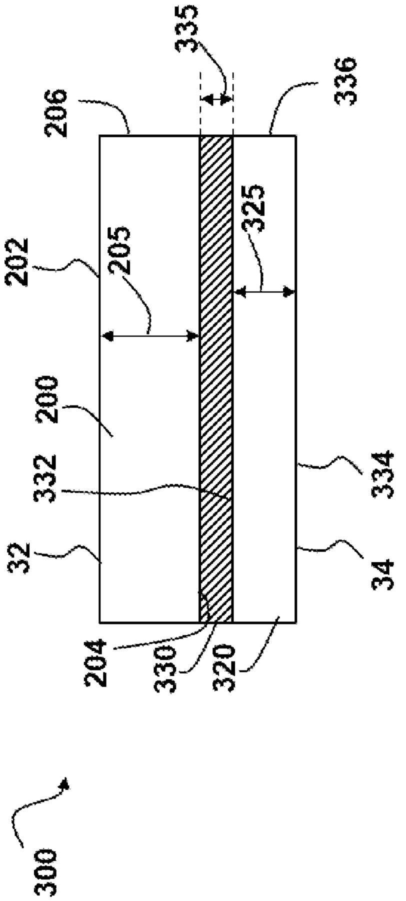
FIG. 3B is a cross-sectional view of the substrate of the window of FIG. 3A taken through the line 3A-3A of FIG. 3A, the substrate including a first glass ply, a second glass ply, and an interlayer, according to one or more embodiments of the present disclosure.

Referring now to FIG. 3B, the components of the substrate 30 are shown in greater detail. As shown, the substrate 30 comprises an asymmetric laminate structure 300, which includes a first glass ply 200 having a first thickness 205, a second glass ply 320 having a second thickness 325, and an interlayer 330 coupling the first glass ply 200 to the second glass ply 320 and comprising a third thickness 335. The first glass ply 200 comprises a first major surface 202 and a second major surface 204. The thickness 205 extends between the first major surface 202 and a second major surface 204 in a direction perpendicular to the first major surface 202. The first major surface 202 forms the first surface 32 of the substrate 30 (e.g., such that the first major surface 202 faces the external environment 26 depicted in FIG. 2). The second glass ply 320 comprises a third major surface 332 and a fourth major surface 334. The second thickness 325 extends between the third major surface 332 and the fourth major surface 334 in a direction perpendicular to the third major surface 332. The fourth major surface 334 forms the second surface 34 of the substrate 30 (e.g., such that the fourth major surface 334 faces sensor cavity 215 depicted in FIG. 2).

In embodiments, the first thickness 205 is substantially greater than the second thickness 325. For example, in embodiments, the first thickness 205 is at least 2.0 times greater than the second thickness (e.g., at least 2.5 greater, at least 3.0 times greater, at least 3.5 times greater, at least 4.0 times greater, at least 4.5 times greater, at least 5.0 times greater). In embodiments, a ratio between the first thickness 205 and the second thickness 325 (first thickness/second thickness) may be greater than 2:1, for example in a range of 2:1 to 20:1, 3:1 to 20:1, 3:1 to 15:1, 3:1 to 10:1, 4:1 to 20:1, 4:1 to 15:1, 4:1 to 10:1, 4.5:1 to 20:1, 4.5:1 to 15:1 4.5:1 to 10:1, 5:1 to 20:1, 5:1 to 15:1, 5:1 to 10:1, 5.75:1 to 20:1, 5.75:1 to 15:1 or 5.75:1 to 10:1. As described herein, such an asymmetric structure 300 beneficially enhances impact performance of the window 24.

In embodiments, the first thickness 205 is at least 0.5 mm, at least 1 mm, at least 2 mm, at least 3 mm, at least 3.3 mm, or at least 3.8 mm. In one or more embodiments, the first thickness is in a range from about 1.5 mm to about 8 mm, 1.6 mm to about 8 mm, from about 1.8 mm to about 8 mm, from about 2 mm to about 8 mm, from about 2.2 mm to about 8 mm, from about 2.4 mm to about 8 mm, from about 2.6 mm to about 8 mm, from about 2.8 mm to about 8 mm, from about 3 mm to about 8 mm, from about 3.1 mm to about 8 mm, from about 3.2 mm to about 8 mm, from about 3.3 mm to about 8 mm, from about 3.4 mm to about 8 mm, from about 3.5 mm to about 8 mm, from about 3.6 mm to about 8 mm, from about 3.7 mm to about 8 mm, from about 3.8 mm to about 8 mm, from about 3.9 mm to about 8 mm, from about 4 mm to about 8 mm, from about 4.2 mm to about 8 mm, from about 4.4 mm to about 8 mm, from about 4.5 mm to about 8 mm, from about 4.6 mm to about 8 mm, from about 4.8 mm to about 8 mm, from about 5 mm to about 8 mm, from about 5.2 mm to about 8 mm, from about 5.4 mm to about 8 mm, from about 5.5 mm to about 8 mm, from about 5.6 mm to about 8 mm, from about 5.8 mm to about 8 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 1.6 mm to about 3.9 mm, from about 1.6 mm to about 3.8 mm, from about 1.6 mm to about 3.7 mm, from about 1.6 mm to about 3.6 mm, from about 1.6 mm to about 3.5 mm, from about 1.6 mm to about 3.4 mm, from about 1.6 mm to about 3.3 mm, from about 1.6 mm to about 3.2 mm, from about 1.6 mm to about 3.1 mm, from about 1.6 mm to about 3 mm, from about 1.6 mm to about 2.8 mm, from about 1.6 mm to about 2.6 mm, from about 1.6 mm to about 2.4 mm, from about 1.6 mm to about 2.2 mm, from about 1.6 mm to about 2 mm, from about 1.6 mm to about 1.8 mm, from about 3 mm to about 5 mm, or from about 3 mm to about 4 mm.

In one or more embodiments, the second thickness 325 may be in the range of about 0.05 mm to about 1.5 mm, for example, in the range of about 0.05 mm to about 1.2 mm, about 0.05 mm to about 1.1 mm, about 0.05 mm to about 1.0 mm, about 0.05 to about 0.9 mm, in the range of about 0.05 to about 0.8 mm, in the range of about 0.05 to about 0.7 mm, in the range of about 0.05 to about 0.6 mm, in the range of about 0.05 to about 0.5 mm, in the range of about 0.05 to about 0.4 mm, in the range of about 0.05 to about 0.3 mm, in the range of about 0.05 to about 0.2 mm, or in the range of about 0.05 to about 0.15 mm.

The thickness values described herein are maximum thicknesses. In one or more embodiments, the first glass ply 200 and the second glass ply 320 have a substantially uniform thicknesses. In embodiments, the first thickness 205 and the second thickness 305 may vary depending on spatial location. While the depicted embodiments are flat, embodiments are also envisioned where one or more of the first glass ply 200 and the second glass ply 320 are curved via a suitable technique (e.g., hot-forming or cold-forming).

In embodiments, the first glass ply 200 is strengthened to a lesser extent than the second glass ply 320 such that the first glass ply 200 and second glass ply 320 comprise different stress distributions therein (e.g., apart from an external forces being applied to the substrate 30). The first glass ply 200 generally has a central tension in a central region thereof that is less than that of the second glass ply 320. In embodiments, for example, the second glass ply 320 is strengthened and the first glass ply 200 is unstrengthened (but may optionally be annealed), such that the first glass ply exhibits a surface compressive stress of less than about 10 MPa, less than about 3 MPa, or about 2.5 MPa or less, 2 MPa or less, 1.5 MPa or less, 1 MPa or less, or about 0.5 MPa or less. In such embodiments, the second glass ply 320 may be thermally, mechanically, or chemically strengthened. In embodiments, for example, the second glass ply 320 is chemically strengthened such that, at the third major surface 332 and the fourth major surface 334, the second glass ply 320 comprises a surface compressive stress of at least 250 MPa, at least 300 MPa, or at least 400 MPa, or at least 500 MPa, or at least 600 MPa, or at least 700 MPa, at least 800 MPa, at least 900 MPa, or at least 1000 MPa. In various embodiments, the second glass ply 320 may comprise a surface compressive stress magnitude at one or more of the third major surface 332 and the fourth major surface 334 that is in a range of about 250 MPa to about 1100 MPa, about 250 MPa to about 900 MPa, about 300 MPa to about 900 MPa, about 400 MPa to about 900 MPa, or in the range of about 500 MPa to about 900 MPa, or in the range of about 600 MPa to about 900 MPa, or in the range of about 700 MPa to about 900 MPa, or in the range of about 800 MPa to about 900 MPa.

In embodiments, the second glass ply 320 may include at least one region of compressive stress, extending from one or more of the third major surface 332 and the fourth major surface 334 to a depth of compression (DOC). In embodiments, the DOC is 15 μm or greater, 20 μm or greater, 25 μm or greater, 30 μm or greater, 35 μm or greater, 40 μm or greater, 45 μm or greater, or 50 μm or greater. In embodiments, the DOC is in the range of about 30 μm to about 150 μm, about 30 μm to about 90 μm, or in the range of about 40 μm to about 80 μm, or in the range of about 40 μm to about 70 μm, or in the range of about 40 μm to about 60 μm, or in the range of about 40 μm to about 50 μm.

The materials for the first glass ply 200 and the second glass ply 320 may be varied. According to one or more embodiments, the materials for the first glass ply 200 and the second glass ply 320 may be the same material (other than differences arising from strengthening treatments) or different materials. In exemplary embodiments, one or both of first glass ply 200 and the second glass ply 320 may be glass (e.g., soda lime glass, alkali aluminosilicate glass, alkali containing borosilicate glass and/or alkali aluminoborosilicate glass) or glass-ceramic (including $Li_2O—Al_2O_3—SiO_2$ system (i.e. LAS-System) glass ceramics, $MgO—Al_2O_3—SiO_2$ System (i.e. MAS-System) glass ceramics, glass ceramics including crystalline phases of any one or more of mullite, spinel, α-quartz, β-quartz solid solution, petalite, lithium disilicate, β-spodumene, nepheline, and alumina).

The first glass ply 200 and the second glass ply 320 may be provided using a variety of different processes. Exemplary glass substrate forming methods include float glass processes and down-draw processes such as fusion draw and slot draw. A glass substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that possess relatively pristine surfaces. Because the average flexural strength of the glass substrate is controlled by the amount and size of surface flaws, a pristine surface that has had minimal contact has a higher initial strength. When this high strength glass substrate is then further strengthened (e.g., chemically), the resultant strength can be higher than that of a glass substrate with a surface that has been lapped and polished. Down-drawn glass substrates may be drawn to a thickness of less than about 2 mm. In addition, down drawn glass substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Once formed, a glass substrate may be strengthened to form a strengthened glass substrate, as described herein. It should be noted that glass ceramic substrates may also be strengthened in the same manner as glass substrates.

Examples of glasses that may be used in the first glass ply 200 or the second glass ply 320 described herein may include borosilicate glass compositions, alkali aluminosilicate glass compositions, alkali aluminoborosilicate glass compositions, soda-lime silicate glass compositions, and other suitable glass compositions. Certain ones of the glass compositions may be characterized as ion exchangeable. As used herein, "ion exchangeable" means that a substrate comprising the composition is capable of exchanging cations located at or near the surface of the substrate with cations of the same valence that are either larger or smaller in size. One example glass composition comprises $SiO_2$, $B_2O_3$ and $Na_2O$, where $(SiO_2+B_2O_3)\geq 66$ mol. %, and $Na_2O\geq 9$ mol. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the first and second glass plies 200 and 320 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$, where 12 mol. %$\leq(Li_2O+Na_2O+K_2O)\leq$20 mol. % and 0 mol. %$\leq$(MgO+CaO)$\leq$10 mol. %.

A still further example glass composition suitable for the first and second glass plies 200 and 320 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %$\leq(Li_2O+Na_2O+K_2O)\leq$18 mol. % and 2 mol. %$\leq$(MgO+CaO)$\leq$7 mol. %.

In a particular embodiment, an alkali aluminosilicate glass composition suitable for the first and second glass plies 200 and 320 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma\text{modifiers})>1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma\text{modifiers})>1$.

In still another embodiment, the first and second glass plies 200 and 320 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %$\leq SiO_2+B_2O_3+CaO\leq$69 mol. %; $Na_2O+K_2O+B_2O_3$+MgO+CaO+SrO>10 mol. %; 5 mol. %$\leq$MgO+CaO+SrO$\leq$8 mol. %; $(Na_2O+B_2O_3)-Al_2O_3\leq$2 mol. %; 2 mol. %$\leq Na_2O-Al_2O_3\leq$6 mol. %; and 4 mol. %$\leq(Na_2O+K_2O)-Al_2O_3\leq$10 mol. %.

In an alternative embodiment, the first and second glass plies 200 and 320 may comprise an alkali aluminosilicate glass composition comprising: 2 mol % or more of $Al_2O_3$ and/or $ZrO_2$, or 4 mol % or more of $Al_2O_3$ and/or $ZrO_2$.

In embodiments, the first glass ply 200 is formed of an anomalous glass composition. An anomalous glass is a glass that tends to exhibit crack-loop or densification fracture behavior where ring cracks surround an initial indention site when the glass is subjected to the Vickers indenter test described in Gross et al., Crack-resistant glass with high shear band density, Journal of Non-Crystalline Solids, 494 (2018) 13-20; and Gross, Deformation and cracking behavior of glasses indented with diamond tips of various sharpness, Journal of Non-Crystalline Solids, 358 (2012) 3445-3452, both of which are incorporated in their entireties. Examples of anomalous glass may be borosilicate glasses (such as the glasses described in PCT Patent Application No. PCT/US2021/61966, filed on Dec. 6, 2021), certain unstrengthened aluminosilicate glasses, or glasses with relatively high silica contents. Such glasses tend to exhibit impact performance characteristics that are favorable over glasses exhibiting normal fracture behavior, where cracks extending radially from the indentation site tend to extend through the thickness of the glass, potentially leading to catastrophic failure. Anomalous glasses such as borosilicates may also tend to exhibit relatively low CTEs, limiting thermally-induced damage from environmental exposure.

In embodiments, the first glass ply 200 comprises a borosilicate glass composition comprising from 60 mol % to 90 mol % $SiO_2$, from about 1 mol % to about 20 mol % $Al_2O_3$, from 7 mol % to 16 mol % $B_2O_3$, from 2 mol % to 20 mol % $R_2O$, where $R_2O$ comprises a combined amount of $Na_2O$, $Li_2O$, and $K_2O$. For example, in embodiments, the borosilicate glass composition comprises about 83.60 mol % $SiO_2$, about 1.20 mol % $Al_2O_3$, about 11.60 mol % $B_2O_3$, about 3.00 mol % $Na_2O$, and about 0.70 mol % $K_2O$, and comprises a CTE of about $32\times10^{-7}$ $K^{-1}$. Such borosilicate glasses may beneficially have greater thermal shock resistance and be more resistant to crack formation from impact events from road debris (e.g, rocks or the like) than soda-lime silicate glasses currently used in certain windows. Borosilicate glasses are known to exhibit anomalous cracking behavior and be less susceptible the formation of cracks that radially propagate from a point of debris impact, which is particularly beneficial for automotive glazing durability.

In embodiments, the first glass ply 200 particularly beneficially comprises one of the fusion-formable borosilicate glass compositions described in U.S. Provisional Patent Application No. 63/123,863, entitled "Fusion Formable Borosilicate Glass Composition and Articles Formed Therefrom" and filed on Dec. 10, 2020, U.S. Provisional Patent Application No. 63/183,271, entitled "Fusion Formable Borosilicate Glass Composition and Articles Formed Therefrom" and filed on May 3, 2021, U.S. Provisional Patent Application No. 63/183,292, entitled "Glass with Unique Fracture Behavior for Vehicle Windshield" and filed on May 3, 2021, U.S. patent application Ser. No. 17/363,266, entitled "Glass with Unique Fracture Behavior for Vehicle Windshield" and filed on Jun. 30, 2021, International Patent Application No. PCT/US2021/061966, entitled "Glass with Unique Fracture Behavior for Vehicle Windshield" and filed on Dec. 6, 2021, and U.S. Provisional Patent Application No. 63/341,603, entitled "Glass with Unique Fracture Behavior for Vehicle Windshield," filed on May 13, 2022, the contents of each of which are hereby incorporated by reference in their entireties. In embodiments, such a borosilicate glass composition comprises, in terms of constituent oxides, $SiO_2$, $B_2O_3$, $Al_2O_3$, one or more alkali metal oxides, and one or more divalent cation oxides selected from the group consisting of MgO, CaO, SrO, BaO, and ZnO. In embodiments the borosilicate glass composition comprises, for example, greater than or equal to 11 mol % and less than or equal to 16 mol % $B_2O_3$, greater than or equal to 2 mol % and less than or equal to 6 mol % $Al_2O_3$, and a total amount of $Na_2O$, $K_2O$, MgO, and CaO that is greater than or equal to 7.0 mol %. Concentrations in mole percent on an oxide basis of $SiO_2$, $B_2O_3$, the one or more alkali metal oxides, $Al_2O_3$, and the one or more alkaline earth metal oxides, satisfy the relationships: $(R_2O+R'O) \geq Al$ and $0.80<(1-[(2R_2O+2R'O)/(SiO_2+2Al_2O_{3+2}B_2O_3)])<0.93$, where $R_2O$ is the sum of the concentrations of the one or more alkali metal oxides and R'O is the sum of the concentrations of the one or more alkaline earth metal oxides. Such glasses have been found to exhibit a favorable ring cracking behavior preventing radial propagation of flaws form an impact point.

In embodiments, the first glass ply 200 comprises a fusion-formable borosilicate glass composition comprising 74 mol % to 80 mol % of $SiO_2$, 2.5 mol % to 6 mol % of $Al_2O_3$, 11.5 mol % to 18 mol % $B_2O_3$, 4.5 mol % to 8 mol % $Na_2O$, 0.5 mol % to 3 mol % $K_2O$, 0.5 mol % to 2.5 mol % MgO, and 0 mol % to 4 mol % CaO (e.g., such that a combined amount of CaO and MgO is less than 5 mol %), and comprise a CTE that is greater than or equal to $32.5\times10^{-7}$ $K^{-1}$ and less than or equal to $56\times10^{-7}$ $K^{-1}$ (e.g., greater than or equal to $40\times10^{-7}$ $K^{-1}$ and less than or equal to $50\times10^{-7}$ $K^{-1}$, greater than or equal to $42\times10^{-7}$ $K^{-1}$ and less than or equal to $48\times10^{-7}$ $K^{-1}$, greater than or equal to $43\times10^{-7}$ $K^{-1}$ and less than or equal to $47\times10^{-7}K^{-1}$). Such a fusion-formable glass composition may comprise concentrations in mole percent on an oxide basis of $SiO_2$, $B_2O_3$, one or more alkali metal oxides ($R_2O$), $Al_2O_3$, and one or more divalent cation oxides R'O, such that the concentrations satisfy some (e.g., one or a combination of more than one) or all the relationships: (relationship 1) $SiO_2 \geq 72$ mol %, such as $SiO_2 \geq 72.0$, such as $SiO_2 \geq 73.0$, such as $SiO_2 \geq 74.0$, and/or $SiO_2 \leq 92$, such as $SiO_2 \leq 90$; (relationship 2) $B_2O_3 \geq 10$ mol %, such as $B_2O_3 \geq 10.0$, such as $B_2O_3 \geq 10.5$, and/or $B_2O_3 \leq 20$, such as $B_2O_3 \leq 18$; (relationship 3) $(R_2O+R'O) \geq Al_2O_3$, such as $(R_2O+R'O) \geq (Al_2O_3+1)$, such as $(R_2O+R'O) \geq (Al_2O_{3+2})$, and/or (relationship 4) $0.80 \leq (1-[(2R_2O+2R'O)/(SiO_2+2Al_2O_3+2B_2O_3)]) \leq 0.93$, where $R_2O$ is the sum of the concentrations of the one or more alkali metal oxides and, when included in the borosilicate glass composition, R'O is the sum of the concentrations of the one or more divalent cation oxides. $R_2O$ may be the sum of $Li_2O$, $Na_2O$, $K_2O$, $Rb_2O$, $Cs_2O$ for example, and R'O may be the sum of MgO, CaO, SrO, BaO, ZnO for example. Compositions meeting the relationships 1-4 described in this paragraph may tend to exhibit a unique fracture behavior where ring cracks form around a region of contact between the glass and an impactor and prevent radial crack propagation. Such fusion-formed glasses may also exhibit superior chemical durability, scratch resistance, mechanical strength, and optical performance (e.g., from both an optical transmission and optical distortion perspective) than other borosilicate glasses. Examples of such glass compositions are provided herein.

Various example compositions of borosilicate glasses included in the first glass ply 200 will now be described. Examples 1-6 are described in terms of composition and various properties in the Table 1 below.

TABLE 1

| Example | 1 | 2 | 3 | 4 | 5 | 6 |
|---|---|---|---|---|---|---|
| $SiO_2$ | 75.35 | 76.72 | 76.14 | 75.18 | 77.19 | 76.36 |
| $Al_2O_3$ | 3.54 | 3.54 | 3.54 | 4.07 | 4.04 | 4.07 |
| $B_2O_3$ | 12.21 | 10.75 | 11.31 | 12.01 | 9.84 | 10.86 |
| $Na_2O$ | 4.60 | 4.67 | 4.68 | 4.61 | 4.70 | 4.57 |
| $K_2O$ | 2.13 | 2.18 | 2.18 | 2.93 | 3.05 | 2.94 |
| MgO | 0.99 | 0.99 | 0.99 | 0.02 | 0.02 | 0.02 |
| CaO | 1.03 | 1.02 | 1.02 | 1.05 | 1.03 | 1.03 |
| $SnO_2$ | 0.14 | 0.13 | 0.13 | 0.13 | 0.13 | 0.14 |
| Density (g/cm$^3$) | 2.307 | 2.308 | 2.308 | 2.316 | 2.335 | 2.324 |
| Strain Point (° C.) | 512.6 | 518.6 | 516.7 | 515.2 | 528.0 | 520.7 |
| LTCTE (ppm/° C.) | 5.1 | 5.24 | 5.1 | 5.58 | 5.55 | 5.56 |
| HTCTE (ppm/° C.) | 25.44 | 25.26 | 24.79 | 24.52 | 24.6 | 24.58 |
| Young's Modulus (GPa) | 66.6 | 67.7 | 67.1 | 66.7 | 69.2 | 67.7 |
| Poisson's Ratio | 0.198 | 0.194 | 0.196 | 0.200 | 0.194 | 0.197 |
| Fulchers A | −1.531 | −1.342 | −1.536 | −1.163 | −1.159 | −1.152 |
| Fulchers B | 5661.3 | 5468.2 | 5817.5 | 4739.4 | 4858.6 | 4848.7 |
| Fulchers $T_0$ | 140.9 | 182.3 | 142.8 | 227.7 | 232.4 | 224.8 |
| 200 P Temp (° C.) | 1618 | 1683 | 1659 | 1596 | 1637 | 1629 |
| 35 kP Temp (° C.) | 1073 | 1111 | 1100 | 1058 | 1084 | 1076 |
| 200 kP Temp (° C.) | 970 | 1005 | 994 | 961 | 985 | 976 |
| Liquidus Viscosity (kP) | 947 | 672 | 1578 | 3779 | 2892 | 4013 |

Additional example borosilicate glass compositions are described in the Table 2 below.

TABLE 2

| Example | 7 | 8 | 9 | 12 | 13 | 14 |
|---|---|---|---|---|---|---|
| $SiO_2$ | 76.75 | 75.93 | 76.38 | 76.34 | 76.06 | 76.15 |
| $Al_2O_3$ | 3.57 | 3.53 | 3.56 | 3.56 | 3.54 | 3.54 |
| $B_2O_3$ | 11.18 | 11.61 | 12.26 | 11.80 | 12.43 | 12.89 |

TABLE 2-continued

| Example | 7 | 8 | 9 | 12 | 13 | 14 |
|---|---|---|---|---|---|---|
| $Na_2O$ | 6.35 | 4.59 | 4.87 | 4.29 | 4.15 | 3.85 |
| $K_2O$ | 2.04 | 2.13 | 1.01 | 1.96 | 1.95 | 1.80 |
| MgO | 0.00 | 0.03 | 1.81 | 0.95 | 0.86 | 0.82 |
| CaO | 0.01 | 2.05 | 0 | 0.99 | 0.90 | 0.86 |
| $SnO_2$ | 0.11 | 0.11 | 0.11 | 0.10 | 0.10 | 0.10 |
| Density (g/cm$^3$) | 2.328 | 2.32 | 2.273 | 2.298 | 2.285 | 2.271 |
| Strain Point (° C.) | 518.6 | 525.8 | 506.2 | 512.7 | 511.1 | 506.6 |
| Anneal Point (° C.) | 564 | 571.4 | 552.9 | 558.7 | 558.2 | 554.9 |
| LTCTE (ppm/° C.) | 5.6 | 5.15 | 4.58 | 4.8 | 4.6 | 4.5 |
| Young's Modulus (GPa) | 68.7 | 68.3 | 63.1 | 65.9 | 64.6 | 63.0 |
| Poisson's Ratio | 0.192 | 0.192 | 0.196 | 0.196 | 0.2 | 0.2 |
| Fulchers A | −1.121 | −0.974 | −1.682 | −1.504 | −1.647 | −1.835 |
| Fulchers B | 4505.1 | 4545.6 | 6535.2 | 12 | 13 | 14 |
| Fulchers $T_0$ | 255.8 | 251.8 | 69 | 76.34 | 76.06 | 76.15 |
| 200 P Temp (° C.) | 1572 | 1640 | 1710 | 1676 | 1695 | 1718 |
| 35 kP Temp (° C.) | 1051 | 1076 | 1119 | 1097 | 1113 | 1121 |
| 200 kP Temp (° C.) | 957 | 976 | 1005 | 987 | 1002 | 1005 |
| Liquidus Viscosity (kP) | 582 | 855 | 1365 | 1021 | 1197 | 1752 |

As shown in the Table 2, examples 12-14 demonstrate that the increasing amount of $B_2O_3$ can have the effect of decreasing density. The above examples include at least 5.5 mol % of $Na_2O+K_2O$ and a total of at least 7.0 mol % of $Na_2O+K_2O+MgO+CaO$. From the examples in Tables 1–2, it is believed that embodiments of the present disclosure will exhibit a T200P and liquidus viscosity for fusion forming where a total amount of $Na_2O+K_2O+MgO+CaO$ is at least 7.0 mol %, especially where there is at least 5.5 mol % of $Na_2O+K_2O$ and at least 1.5 mol % of MgO+CaO. It is further believed that embodiments of the present disclosure will exhibit the requisite T200p and liquidus viscosity for fusion forming where $Na_2O+K_2O$ is at least 8 mol % without regard to the amount of MgO and CaO.

Referring still to FIG. 3B, the interlayer 330 is formed of a suitable material and the third thickness 335 is selected such that the substrate 30 exhibits desired optical performance attributes (e.g., in terms of reflectance and transmittance) over a suitable wavelength range of interest. In embodiments, the interlayer 330, in isolation, exhibits an average transmittance of greater than or equal to 98% (e.g., greater than or equal to 98.25%, greater than or equal to 98.5%, greater than or equal to 98.75%, greater than or equal to 99.0%, greater than or equal to 99.25%) over the 50 nm wavelength range of interest for light normally incident on the interlayer 330. As a result, substrate 30, in combination (without any additional layered films/coatings), may exhibit an average transmittance of greater than 90% (e.g., greater than or equal to 90.25%, greater than or equal to 90.5%, greater than or equal to 90.75%, greater than or equal to 91.0%, greater than or equal to 91.25%) over the 50 nm wavelength range of interest for light normally incident on the first surface 32. Such optical performance is superior than that obtainable when using typical polymer interlayers (such as polyvinyl butyral interlays) to assembly glass laminates.

In embodiments, the interlayer 330 is formed of a suitable optically clear adhesive (e.g., a tape-based optically clear adhesive such as 3M™ Optically Clear Adhesive 8146-1 or 3M™ Optically Clear Adhesive 8214). In embodiments, the interlayer 330 is formed of a suitable acrylate-based radiation-curable resin, such as Loctite® AA 3491 or Uvekol® S one-component acrylic resin. As described with respect to the Examples herein, such materials have been found to exhibit the optical performance characteristics that are favorable for various sensor wavelength ranges of interest (e.g., from 925 nm to 975 nm or from 1525 to 1575 nm). Any suitable interlayer material capable of meeting the optical and impact performance standards described herein may be used. The method of assembling the substrate 30 may vary depending on the type of adhesive used.

In embodiments, the third thickness 335 is in a range of from 0.05 mm to 1.5, from 0.05 mm to 1.4 mm, from 0.1 to 1.4 mm, from 0.1 mm to 1.3 mm, from 0.1 mm to 1.2 mm, from 0.1 mm to 1.1 mm, from 0.1 mm to 1.0 mm, from 0.1 mm to 0.95 mm, from 0.1 mm to 0.90 mm, from 0.1 mm to 0.85 mm, from 0.1 mm to 0.80 mm, from 0.1 mm to 0.75 mm, from 0.1 mm to 0.70 mm, from 0.1 mm to 0.65 mm, from 0.1 mm to 0.60 mm, from 0.1 mm to 0.55 mm, from 0.1 mm to 0.50 mm, from 0.1 mm to 0.45 mm, from 0.1 mm to 0.40 mm, from 0.1 mm to 0.35 mm, from 0.1 mm to 0.30 mm, from 0.1 mm to 0.25 mm, from 0.1 mm to 0.20 mm. The thickness may be selected to achieve a particular optical performance, depending on the interlayer material selected.

The optical performance of the substrate 30 may be adjusted via incorporation of different functional layers (e.g., anti-reflective coatings, decorative coatings) or surface treatments (e.g., anti-glare surface treatments). In embodiments, for example, the substrate 30 includes a visible light absorbing, IR-transmitting material layer. Examples of such materials include infrared transmitting, visible absorbing acrylic sheets, such as those commercially available from ePlastics under the trade names Plexiglas® IR acrylic 3143 and CYRO's ACRYLITE® IR acrylic 1146. Plexiglas® IR acrylic 3143 has a transmissivity of about 0% (at least less than 10%, or less than 1%) for electromagnetic radiation having wavelengths of about 700 nm or shorter, but a transmissivity of about 90% (above 85%) for wavelengths within the range of 800 nm to about 1100 nm (including 905 nm).

In embodiments, each of the layers of the substrate 30 exhibits a refractive index in the range from about 1.40 to about 1.60 (e.g., at a central wavelength of the 50 nm wavelength range of interest described herein). In embodiments, the substrate exhibits an average transmission of greater than or equal to 95% (e.g., greater than or equal to 96%, greater than or equal to 97%, greater than or equal to 98%, greater than or equal to 99%, greater than or equal to 99.5%) throughout the 50 nm wavelength range of interest described herein.

Figure 4:
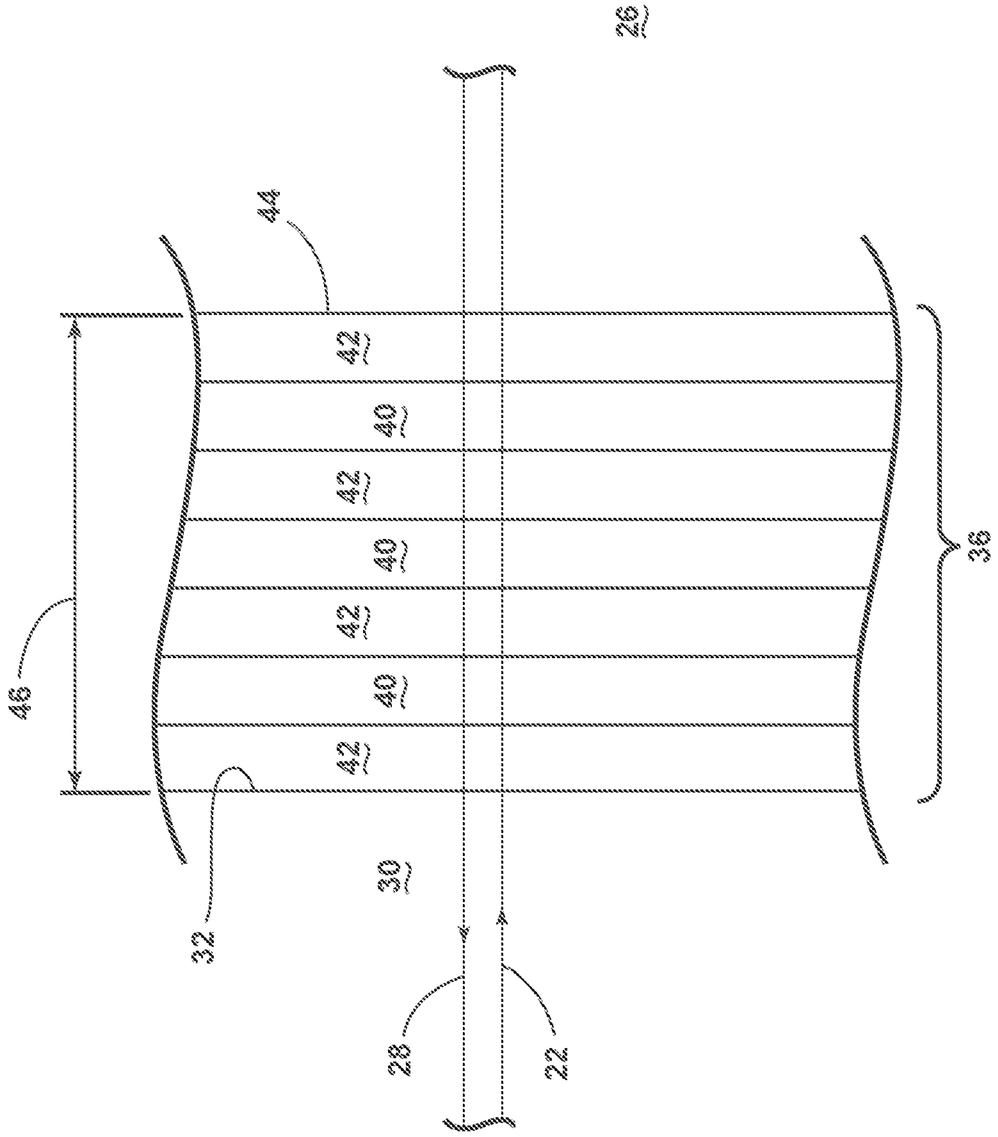
FIG. 4 is a cross-sectional view of the window of FIG. 3 taken at area IV of FIG. 3A, illustrating the layered film including alternating layers of one or more higher refractive index materials and one or more lower refractive index materials with a layer of the one or more lower refractive index materials providing a terminal surface closest to the external environment, according to one or more embodiments of the present disclosure.
Figure 5:
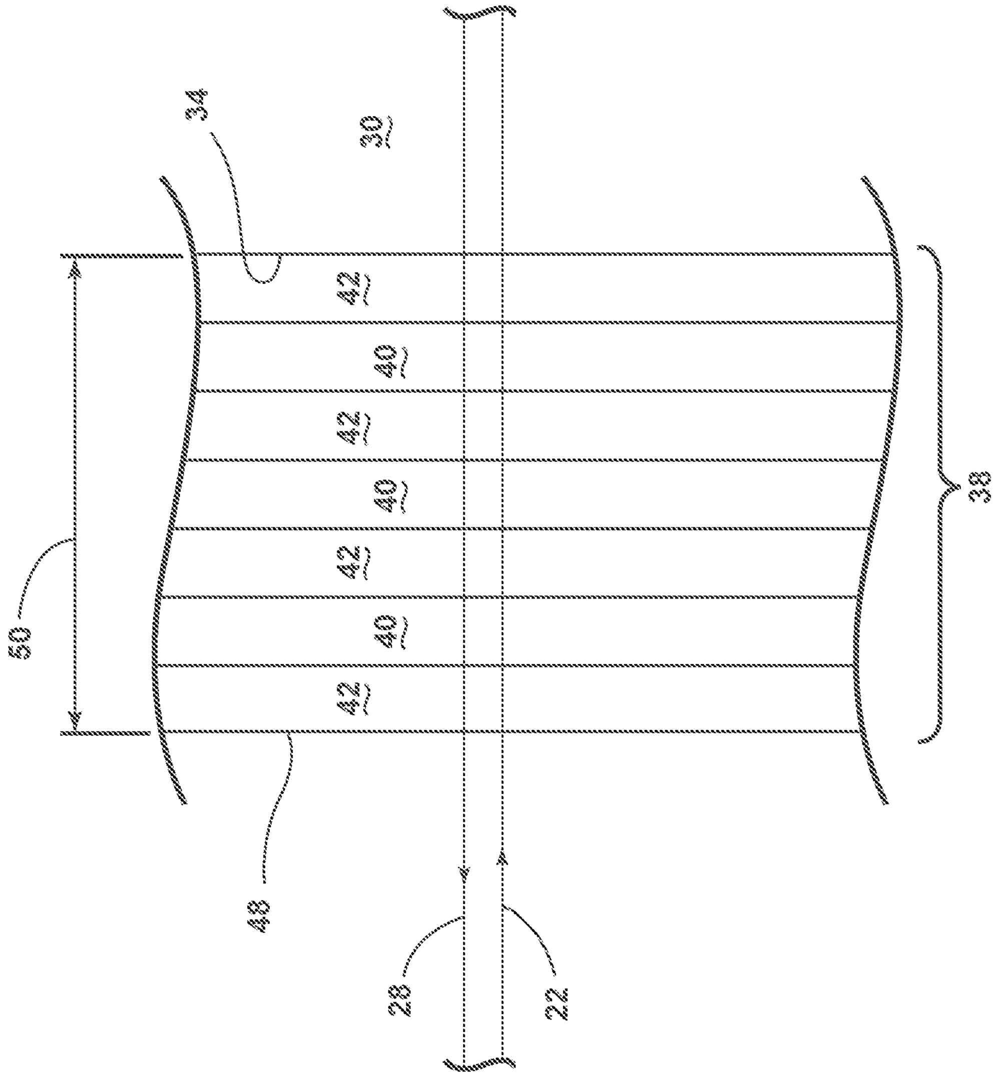
FIG. 5 is a cross-sectional view of the window of FIG. 3 taken at area V of FIG. 3A, illustrating the second layered film including alternating layers of one or more higher refractive index materials and one or more lower refractive index materials with a layer of the one or more lower refractive index materials providing a terminal surface closest to the electromagnetic radiation emitter and sensor, according to one or more embodiments of the present disclosure.

Referring now to FIGS. 4 and 5, the first layered film 36 and the second layered film 38 each include a quantity of alternating layers of one or more higher refractive index materials 40 and one or more lower refractive index materials 42. While each of the one or more higher refractive index materials 40 and the one or more lower refractive index materials 42 are identified using the same reference numerals, it should be understood that the utilization of the same reference numeral does not indicate that each of the layers are constructed of the same material or include the same structure. In each of the first and second layered films 36 and 38, different ones of the layers of the respective higher refractive index materials 40 and the lower refractive index materials 42 may include different composition al or structural properties.

As used herein, the terms "higher refractive index" and "lower refractive index" refer to the values of the refractive index relative to each other, with the refractive index/indices of the one or more higher refractive index materials 40 being greater than the refractive index/indices of the one or more lower refractive index materials 42. In embodiments, the one or more higher refractive index materials 40 have a refractive index from about 1.7 to about 4.0. In embodiments, the one or more lower refractive index materials 42 have a refractive index from about 1.3 to about 1.6. In embodiments, the one or more lower refractive index materials 42 have a refractive index from about 1.3 to about 1.7, while the one or more higher refractive index materials 40 have a refractive index from about 1.9 to about 3.8. The difference in the refractive index of any of the one or more higher refractive index materials 40 and any of the one or more lower refractive index materials 42 may be about 0.1 or greater, 0.2 or greater, 0.3 or greater, 0.4 or greater, 0.5 or greater, 0.6 or greater, 0.7 or greater, 0.8 or greater, 0.9 or greater, 1.0 or greater, 1.5 or greater, 2.0 or greater, 2.1 or greater, 2.2 or greater, or even 2.3 or greater. Because of the difference in the refractive indices of the one or more higher refractive index materials 40 and the one or more lower refractive index materials 42, manipulation of the quantity (number) of alternating layers and their thicknesses can cause selective transmission of electromagnetic radiation within a range of wavelengths through the window 24 and, separately, selective reflectance of electromagnetic radiation within a range of wavelengths off of the first layered film 36. The first layered film 36 (and the second layered film 38, if utilized) is thus a thin-film optical filter having predetermined optical properties configured as a function of the quantity, thicknesses, number, and materials chosen as the one or more higher refractive index materials 40 and the one or more lower refractive index materials 42.

Some examples of suitable materials for use as the one or more lower refractive index materials 42 include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use as the one or more lower refractive index materials 42 may be minimized (e.g., in materials such as $AlO_xN_y$, $SiO_xN_y$, and $Si_uAl_xO_xN_y$).

Some examples of suitable materials for use as the one or more higher refractive index materials 40 include Si, amorphous silicon (a-Si), $SiN_x$, $SiN_x$:$H_y$, $AlN_x$, $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$, and diamond-like carbon. The oxygen content of the materials for the higher refractive index materials 40 may be minimized, especially in $SiN_x$ or $AlN_x$ materials. $AlO_xN_y$ materials may be considered to be oxygen-doped $AlN_x$, that is they may have an $AlN_x$ crystal structure (e.g., wurtzite) and need not have an AlON crystal structure. Exemplary preferred $AlO_xN_y$ materials for use as the one or more higher refractive index materials 40 may comprise from about 0 atom % to about 20 atom % oxygen, or from about 5 atom % to about 15 atom % oxygen, while including 30 atom % to about 50 atom % nitrogen. Exemplary preferred $Si_uAl_vO_xN_y$ for use as the one or more higher refractive index materials 40 may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Because the refractive indices of the one or more higher refractive index materials 40 and the one or more lower refractive index materials 42 are relative to each other, the same material (such as $Al_2O_3$) can be appropriate for the one or more higher refractive index materials 40 depending on the refractive index of the material(s) chosen for the one or more lower refractive index materials 42, and can alternatively be appropriate for the one or more lower refractive index materials 42 depending on the refractive index of the material(s) chosen for the one or more higher refractive index materials 40.

In embodiments, the one or more lower refractive index materials 42 of the first layered film 36 consists of layers of $SiO_2$, and the one or more higher refractive index materials 40 of the first layered film 36 consists of layers of $SiO_xN_y$ or $SiN_x$. In embodiments, the one or more lower refractive index materials 42 of the first layered film 36 consists of layers of $SiO_2$, and the one or more higher refractive index materials 40 of the first layered film 36 consists of layers of $SiN_x$ or $SiO_xN_y$ and Si (e.g., a-Si), while the one or more lower refractive index materials 42 of the second layered film 38 consists of layers of $SiO_2$ and the one or more higher refractive index materials 40 of the second layered film 38 comprises layers of $SiN_x$ or $SiO_xN_y$ and Si (e.g., a-Si).

The quantity of alternating layers of the higher refractive index materials 40 and the lower refractive index material 42 in either the first layered film 36 or the second layered film 38 is not particularly limited. In embodiments, the number of alternating layers within the first layered film 36 is 7 or more, 9 or more, 11 or more, 13 or more, 15 or more, 17 or more, 19 or more, 21 or more, 23 or more, 25 or more, or 51 or more, or 81 or more. In embodiments, the quantity of alternating layers within the second layered film 38 is 7 or more, 9 or more, 11 or more, 13 or more, 15 or more, 17 or more, 19 or more, 21 or more, 23 or more, or 25 or more, or 51 or more, or 81 or more. In embodiments, the quantity of alternating layers in the first layered film 36 and the second layered film 38 collectively forming the window 24, not including the substrate 30, is 14 or more, 20 or more, 26 or more, 32 or more, 38 or more, 44 or more, 50 or more, 72 or more, or 100 or more. In general, the greater the quantity of layers within the first layered film 36 and the second layered film 38, the more narrowly the transmittance and reflectance properties of the window 24 are tailored to one or more specific wavelengths or wavelength ranges.

Each of the alternating layers of the first layered film 36 and the second layered film 38 has a thickness. The thicknesses selected for each of the alternating layers determines the optical path lengths of light propagating through the window 24 and determines the constructive and destructive interference between different light rays reflected at each material interface of the window 24. Accordingly, the thicknesses of each of the alternating layers, in combination with the refractive index of the one or more higher refractive index materials 40 and the one or more lower refractive index materials 42 determines the reflectance and transmittance spectra of the window 24.

With reference to FIGS. 3A, 3B, 4, and 5, the reflected radiation 28 first encounters a terminal surface 44 of the first layered film 36 upon interacting with the window 24, and the terminal surface 44 may be open to the external environment 26. In an embodiment, a layer of the one or more lower refractive index materials 42 provides the terminal surface 44 to more closely match the refractive index of the air in the external environment 26 and thus reduce reflection of incident electromagnetic radiation (whether the reflected radiation 28 or otherwise) off of the terminal surface 44. The layer of the one or more lower refractive index materials 42 that provides the terminal surface 44 is the layer of the first layered film 36 that is farthest from the substrate 30. Similarly, in embodiments, when the one or more lower refractive index materials 42 is $SiO_2$, a layer of $SiO_2$, as the one or more lower refractive index materials 42, is disposed directly onto the first surface 32 of the substrate 30, which will typically comprise a large mole percentage of $SiO_2$. Without being bound by theory, it is thought that commonality of $SiO_2$ in both the substrate 30 and the adjacent layer of the one or more lower refractive index materials 42 allows for increased bonding strength.

The emitted radiation 22 first encounters a terminal surface 48 of the second layered film 38 upon interacting with the window 24. In an embodiment, a layer of the one or more lower refractive index materials 42 provides the terminal surface 48 to more closely match the refractive index of the air within the enclosure 20 and thus reduce reflection of the emitted radiation 22 off of the terminal surface 48. The layer of the one or more lower refractive index materials 42 that provides the terminal surface 48 is the layer of the second layered film 38 that is farthest from the substrate 30. Similarly, in embodiments, when the one or more lower refractive index materials 42 is $SiO_2$, a layer of $SiO_2$, as the one or more lower refractive index materials 42, is disposed directly onto the second surface 34 of the substrate 30.

Materials that have a relatively high refractive index can simultaneously have a relatively high hardness that provides scratch and impact resistance. An example material that has both high hardness and can be one of the one or more higher refractive index materials 40 is $SiO_xN_y$. Other example materials that have both high hardness and can be the higher refractive index materials 40 are $SiN_x$, $SiN_x$: $H_y$, and $Si_3N_4$. It has been found that a relatively thick (e.g., greater than or equal to 500 nm) layer of $SiO_xN_y$ (or other suitable higher refractive index material) may increase the scratch and/or damage resistance of the window 24. Such increased scratch and/or damage resistance may be particularly beneficial in the first layered film 36, which may be more likely to encounter impacts of debris from the external environment 26. Accordingly, in embodiments, the first layered film 36 comprises a layer of one of the one or more higher refractive index materials 40 with a thickness greater than or equal to 500 nm (e.g., greater than or equal to 1000 nm, greater than or equal to 1500 nm, greater than or equal to 2000 nm). Such a higher refractive index layer having such a thickness of 500 nm or more is described herein as a "scratch resistant layer."

In embodiments, the thickness and location within the first layered film 36 of the scratch resistant layer can be optimized to provide a desired level of hardness and scratch resistance to the first layered film 36 and thus the window 24 as a whole. Different applications of the window 24 could lead to different desired thicknesses for the scratch resistant layer of the higher refractive index materials 40 serving as the layer providing the hardness and scratch resistance to the window 24. For example, a window 24 protecting a LIDAR system 12 on a vehicle 10 may require a different thickness for the scratch resistant layer of the higher refractive index materials 40 than a window 24 protecting a LIDAR system 12 at an office building. In embodiments, the scratch resistant layer of the higher refractive index materials 40 serving as the layer providing the hardness and scratch resistance to the window 24 has a thickness between 500 nm and 50000 nm, such as between 500 nm and 10000 nm, such as between 2000 nm to 5000 nm. In embodiments, the thickness of this scratch resistant layer of higher refractive index materials 40 has a thickness that is 50% or more, 65% or more, or 85% or more, or 86% or more, of the thickness of the first layered film 36. In general, the scratch resistant layer of the higher refractive index materials 40 serving as the layer providing the hardness and scratch resistance to the window 24 will be part of the first layered film 36 facing the external environment 26 rather the second layered film 38 protected by the enclosure 20, although that may not always be so.

As will be detailed further below, the quantity, thicknesses, number, and materials of the remaining layers of the first layered film 36 and the second layered film 38 can be configured to provide the window 24 with the desired optical properties (transmittance and reflectance of desired wavelengths) almost regardless of the thickness chosen for the scratch resistant layer of the higher refractive index materials 40 serving as the layer providing the hardness and scratch resistance to the window 24. This insensitivity of the optical properties of the window 24 as a whole to the thickness of the scratch resistant layer of the higher refractive index materials 40 serving as the layer providing the hardness and scratch resistance to the window 24 when materials having relatively low or negligible optical absorption of electromagnetic radiation of the target wavelength or wavelength range (e.g., from 1400 nm to 1600 nm, 1550 nm). For example, $Si_3N_4$ only negligibly absorbs electromagnetic radiation in the 700 nm to 2000 nm wavelength range.

This general insensitivity allows the scratch resistant layer of the higher refractive index materials 40 in the first layered film 36 to have a thickness predetermined to meet specified hardness or scratch resistance requirements. For example, the first layered film 36 for the window 24 utilized at the roof 14 of the vehicle 10 may have different hardness and scratch resistance requirements than the first layered film 36 for the window 24 utilized at the forward portion 16 of the vehicle 10, and thus a different thickness for the scratch resistant layer of the higher refractive index materials 40. This can be achieved without significant altering of the transmittance and reflectance properties of the first layered film 36 as a whole.

The hardness of the first layered film 36, and thus the window 24, with the scratch resistant layer of the higher refractive index materials 40 can be quantified. In embodiments, the maximum hardness of the window 24, measured at the first layered film 36 with the scratch resistant layer of the higher refractive index materials 40, as measured by the Berkovich Indenter Hardness Test, may be about 8 GPa or greater, about 10 GPa or greater, about 12 GPa or greater, about 14 GPa or greater, about 15 GPa or greater, about 16 GPa or greater, or about 18 GPa or greater at one or more indentation depths from 50 nm to 2000 nm (measured from the terminal surface 44), and even from 2000 nm to 5000 nm. As used herein, the "Berkovich Indenter Hardness Test" includes measuring the hardness of a material on a surface thereof by indenting the surface with a diamond Berkovich indenter. The Berkovich Indenter Hardness Test includes indenting the terminal surface 44 of the first layered film 36 with the diamond Berkovich indenter to form an indent to an indentation depth in the range from about 50 nm to about 2000 nm (or the entire thickness of the first layered film 36) and measuring the maximum hardness from this indentation along the entire indentation depth range or a segment of this indentation depth range (e.g., in the range from about 100 nm to about 600 nm), generally using the methods set forth in Oliver, W. C.; Pharr, G. M. *An improved technique for determining hardness and elastic modulus using load and displacement sensing indentation experiments*. J. Mater. Res., Vol. 7, No. 6, 1992, 1564-1583; and Oliver, W. C.; Pharr, G. M. *Measurement of Hardness and Elastic Modulus by Instrument Indentation: Advances in Understanding and Refinements to Methodology*. J. Mater. Res., Vol. 19, No. 1, 2004, 3-20. These levels of hardness improve the resistance of the window 24 to impact damage from sand, small stones, debris, and other objects encountered while the LIDAR system 12 is used for its intended purpose, such as with the vehicle 10 (see FIG. 1). Accordingly, these levels of hardness reduce or prevent the optical scattering and reduced performance of the LIDAR system 12 that the impact damage would otherwise cause.

In embodiments, at least a portion of the first layered film 36 is disposed between the scratch resistant layer of the higher refractive index materials 40 and the terminal surface 44. In embodiments, the first layered film 36 comprises a plurality of alternating layers of the one or more lower refractive index materials 42 and the one or more higher refractive index materials 40 between the terminal surface 44 and the scratch resistant layers. Such a stack of alternating layers disposed between the scratch resistant layer and the terminal surface 44 is described herein as the "optical control layers." In embodiments, the optical control layers, disposed between the scratch resistant layer and the terminal surface 44, have a combined thickness of greater than or equal to 500 nm (e.g., greater than or equal to 600 nm, greater than or equal to 700 nm, greater than or equal to 800 nm, greater than or equal to 800 nm, greater than or equal to 1000 nm, greater than or equal to 1100 nm, greater than or equal to 1200 nm, greater than or equal to 1300 nm). The quantity, composition, and thickness of the optical control layers may be selected to provide desired anti-reflection performance attributes described herein at an operational wavelength of the LIDAR system 12 between 1400 nm and 1600 nm. That way, the second layered film 38 may be designed to provide desirable optical performance characteristics in the visible and/or UV spectrum, as described herein.

In embodiments, at least 25% (e.g., at least 26%, at least 27%, at least 28%, at least 29%, at least 30%) of a thickness 46 of the first layered film 36 is disposed between the scratch resistant layer and the terminal surface 44. It is believed that such a depth of the scratch resistant layer within the first layered film 36 facilitates the first layered film 36 having a relatively high nanoindentation hardness (as measured by the Berkovich Indenter Hardness Test) over a relatively large range of depths within the first layered film 36. In embodiments, the first layered film 36 has a nanoindentation hardness of greater than or equal to 8 GPa from a depth of 250 nm to a depth of 2000 nm within the first layered film 36. In embodiments, the first layered film 36 has a nanoindentation hardness of greater than or equal to 8.5 GPa from a depth of 1000 nm to a depth of 2000 nm within the first layered film 36. Such hardness values facilitate providing scratch and/or damage resistance against flaws having a relatively wide range of depths.

Referring now to FIGS. 4 and 5, the first layered film 36 has a thickness 46, and the second layered film 38 has a thickness 50. The thickness 46 of the first layered film 36, assumed to include the scratch resistant layer of the one or more higher refractive index materials 40, may be about 1 μm or greater while still providing the transmittance and reflectance properties described herein. In embodiments, the thickness 46 is in the range of 1 μm to just over 50 μm, including from about 1 μm to about 10 μm, and from about 2800 nm to about 5900 nm. The lower bound of about 1 μm is approximately the a minimum value for the thickness 46 that still provides hardness and scratch resistance to the window 24. The higher bound of thickness 46 is limited by cost and time required to dispose the layers of the first layered film 36 onto the substrate 30. In addition, the higher bound of the thickness 46 is limited to prevent the first layered film 36 from warping the substrate 30, which is dependent upon the thickness of the substrate 30. The thickness 50 of the second layered film 38 can be any thickness deemed necessary to impart the window 24 with the desired transmittance and reflectance properties. In embodiments, the thickness 50 of the second layered film 38 is in the range of about 800 nm to about 7000 nm.

While solving the problem discussed above in the background through imparting hardness, impact, and scratch resistance to the window 24 via the maximized thickness of a higher refractive index materials 40, the quantity, thicknesses, number, and materials of the layers of the first layered film 36 and the second layered film 38 are configured to also provide a relatively high transmittance of infrared radiation at a suitable 50 nm wavelength range of interest associated with a sensor system. In embodiments, the quantity, thicknesses, number, and materials of the layers of the first layered film 36 and the second layered film 38 are configured such that the window 24 possess an average transmittance of greater than or equal to 95% (e.g., greater than or equal to 95.5%, greater than or equal to 96.0%, greater than or equal to 96.5%, greater than or equal to 97.0%, greater than or equal to 97.5, greater than or equal to 98%, greater than or equal to 98.5%, greater than or equal to 99%, greater than or equal to 99.5%) over a 50 nm wavelength range of interest contained in the wavelength range of 800 nm to 1800 nm for light normally incident on the window 24. In embodiments, the quantity, thicknesses, number, and materials of the layers of the first layered film 36 and the second layered film 38 are configured such that the window 24 possess an average reflectance of less than or equal to 5.0% (e.g., less than or equal to 4.5%, less than or equal to 4.0%, less than or equal to 3.5%, less than or equal to 3.0%, less than or equal to 2.5%, less than or equal to 2.0%, less than or equal to 1.5%, less than or equal to 1.0%, less than or equal to 0.5%).

The particular configuration of the first and second layered films 36 and 38 may vary depending on the wavelength range of interest. For example, in embodiments, the first and second layered films 36 and 38 may be structured for a 50 nm wavelength range including a central wavelength of about 905 nm. In such embodiments, the first and second layered films may generally have the structure described in International Patent Application Publication No. WO 2020/247245, entitled "Hardened Optical Windows for LiDAR Applications at 850-950 nm," filed on May 29, 2020, hereby incorporated by reference in its entirety.

In embodiments, the first and second layered films 36 and 38 may be structured for a 50 nm wavelength range including a central wavelength of about 1550 nm. In such embodiments, the first and second layered films may generally have the structure described in International Patent Application Publication No. WO 2020/247292, entitled "Hardened Optical Windows with Anti-Reflective, Reflective, and Absorbing Layers for Infrared Sensing Systems," filed on Jun. 1, 2020, hereby incorporated by reference in its entirety. In such embodiments, the quantity, thicknesses, number, and materials of the layers of the first layered film 36 and the second layered film 38 may be configured such that the window 24 possess an average percentage reflectance of less than 10% for electromagnetic radiation having a wavelength of 1550 nm at any angle of incidence within the range of 0° to 8°.

Additional performance attributes (e.g., appearance, optical performance outside of the wavelength range of interest associated with the sensor) may be provided to the window 24 via the design of the first layered film 36 and the second layered film 38. For example, in embodiments, the first and second layered films 36 and 38 may be configured such that the window 24 exhibits a black or opaque appearance when viewed from the terminal surface 44 and exhibits relatively low transmittance and reflectance throughout the visible spectrum. In such embodiments, the first layered film 36 and the second layered film 38 may be structured as described in U.S. Provisional Patent Application No. 63/344,147, entitled "Hardened Optical Windows with Anti-Reflective Films Having Low Visible Reflectance and Transmission for Infrared Sensing system," filed on May 20, 2022, hereby incorporated by reference in its entirety.

In such embodiments, the thicknesses, number, and materials of the alternating layers of the first and second layered films 36 and 38 are configured so that the window 24 has an average reflectance, calculated over a 50 nm wavelength range of interest from 1400 nm to 1600 nm, of less than or equal to 0.5% (e.g., less than or equal to 0.4%, less than or equal to 0.3%, less than or equal to 0.2%, less than or equal to 0.1%, less than or equal to 0.08%) for light incident on the first surface 32 and the second surface 34 at angles within 15° of normal to the first surface 32 and the second surface 34. Additionally, in such embodiments, the number, thicknesses, number, and materials of the alternating layers of the first and second layered films 36 and 38 are configured so that the window has an average P polarization transmittance and an average S polarization transmittance, calculated over a 50 nm wavelength range of interest from 1400 nm to 1600 nm, of greater than 85% (e.g., greater than or equal to 86%, greater than or equal to 87%, greater than or equal to 88%, greater than or equal to 89%, greater than or equal to 90%, greater than or equal to 91%, greater than or equal to 92%) for light incident on the first surface 32 and the second surface 34 at angles within 60° of normal (e.g., at angles of incidence from 0° to 60°, from 0° to 50°, from 0° to 40°, from 0° to) 30° to the first surface 32 and the second surface 34. Additionally, in such embodiments, when viewed from the external environment 26 (see FIG. 2), the window 24 may exhibit CIELAB color space a* and b* values that are greater than or equal to −6.0 and less than or equal to 6.0 for light having angles of incidence on the first surface 32 ranging from 0° to 90°. Such color space values may be obtained even in embodiments where the substrate 30 is has a relatively high transmittance (e.g., greater than 90%) and low reflectance (e.g., less than or equal to 22%) throughout the visible spectrum. The thicknesses, number, and materials of the alternating layers of the first and second layered films 36 and 38 are configured so that the window 24 has a CIELAB lightness L* value of less than 45 (e.g., less than or equal to 40, less than or equal to 35, less than or equal to 30) when viewed from angles of incidence of less than or equal to 60°.

In embodiments, the first and second layered films 36 and 38 are constructed such that the window 24 exhibits a transparent appearance when viewed from the terminal surface 44. In such embodiments, the first layered film 36 and the second layered film 38 may be structured as described in U.S. Provisional Patent Application No. 63/289,828, entitled "Hardened Optical Windows with Anti-Reflective Films Having Low Reflectance and High Transmission in Multiple Spectral Ranges," filed on Dec. 15, 2021, hereby incorporated by reference in its entirety. In such embodiments, the thicknesses, and materials of the alternating layers of the first and second layered films 36 and 38 are configured so that the window 24 has an average percentage transmittance of greater than or equal to 70% (e.g., greater than or equal to 80%, greater than or equal to 85%) for light in the visible spectrum that is incident on the first surface 32 or the second surface 34 at angles of incidence of 60° or less. For example, when viewed from the external environment 26 (see FIG. 1), the window 24 may exhibit CIELAB color space a* and b* values that are greater than or equal to −6.0 and less than or equal to 6.0 for light having angles of incidence on the first surface 32 ranging from 0° to 90°. Such color space values may be obtained even in embodiments where the substrate 30 is has a relatively high transmittance (e.g., greater than 90%) and low reflectance (e.g., less than or equal to 22%) throughout the visible spectrum. In such embodiments, the number, thicknesses, and materials of the alternating layers of the first and second layered films 36 and 38 are configured so that the window 24 has an average P polarization transmittance and an average S polarization transmittance, calculated over a 50 nm wavelength range of interest from 1400 nm to 1600 nm, of greater than 85% (e.g., greater than or equal to 86%, greater than or equal to 87%, greater than or equal to 88%, greater than or equal to 89%, greater than or equal to 90%) for light incident on the first surface 32 and the second surface 34 at angles within 60° of normal (e.g., at angles of incidence from 0° to 60°, from 0° to 50°, from 0° to 40°, from 0° to) 30° to the first surface 32 and the second surface 34.

In embodiments, one or more of the first layered film 36 and the second layered film 38 may include one or more transparent conductive oxide layers such that the window 24 exhibits microwave energy attenuation of at least 15 dB for radiation greater than 1 GHz. Alternatively or additionally, in such embodiments, the second layered film 38 may include one or more absorption layers that are not in direct contact with the substrate 30. Such absorption layers may not be present in the first layered film 36. In such embodiments, the first and second layered films 36 and 38 may be constructed as described in U.S. Provisional Patent Application No. 63/284,161, entitled "Durable Optical Windows for LiDAR Applications," filed on Nov. 30, 2021, hereby incorporated by reference in its entirety.

The layers of the first layered film 36 and the second layered film 38 (i.e., layers of the higher refractive index materials 40 and the lower refractive index material 42) may be formed by any known method in the art, including discrete deposition or continuous deposition processes. In one or more embodiments, the layer may be formed using only continuous deposition processes, or, alternatively, only discrete deposition processes.

EXAMPLES

Example first and second layered films—an example combination of layered films believed to be suitable for use with the asymmetrical laminate structures described herein is provided in the Table 3 below. In the example, the first layered film 36 included twelve (12) alternating layers of $SiO_2$ as the lower refractive index material 42 and $SiN_x$ and a-Si as the higher refractive index materials 40. Layers 7 and 5 of the first layered film 36 were formed of silicon to provide absorbance in the visible spectrum and also eliminate layers necessary to achieve desirable performance in the infrared. Layers 7 and 5 were also adjacent to other layers of higher index material (e.g., layers 7 and 8 form a combined higher index layer and layers 4 and 5 form another combined higher index layer). Layer 4 was the scratch resistant layer of the higher refractive index materials 40, having a thickness of 2000 nm. As such, the scratch resistant layer was adjacent a silicon layer to provide a layer of higher index material of relatively high thickness. In this example, the scratch resistant layer constituted 48% of the thickness of the first layered film 36.

The second layered film 38 included seven (7) alternating layers of the lower refractive index materials 42 and the higher refractive index materials 40. In this example, the lower refractive index material 42 was $SiO_2$, while the higher refractive index materials 40 was $SiN_x$ and a-Si. The closest lower refractive index material to the substrate 30 was Si to provide absorbance in the visible spectrum and reduce the number of layers necessary to achieve a desirable performance in the infrared.

The thicknesses of the layers of the first layered film 36 and the second layered film 38 were configured as set forth in Table 3 below.

TABLE 3

| Example Layer Design | | | |
|---|---|---|---|
| Layer | Material | Refractive Index @1550 nm | Physical Thickness (nm) |
| Medium | Air | 1 | |
| | Perfluoropolyether | ~1.4 | 4-8 |
| 12 | $SiO_2$ | 1.46349 | 247.4 |
| 11 | $SiN_x$ | 2.01269 | 255.14 |
| 10 | $SiO_2$ | 1.46349 | 418.3 |
| 9 | $SiN_x$ | 2.01269 | 195.54 |
| 8 | $SiO_2$ | 3.74413 | 40.57 |
| 7 | $SiN_x$ | 1.46349 | 89.39 |
| 6 | $SiO_2$ | 3.74413 | 25.23 |
| 5 | Si | 1.98699 | 2000 |
| 4 | $SiN_x$ | 1.46349 | 72.24 |
| 3 | $SiO_2$ | 2.01269 | 76.87 |
| 2 | $SiN_x$ | 1.46349 | 25 |
| 1 | $SiO_2$ | 1.46349 | 247.4 |
| Substrate | Aluminosilicate glass (2320) | 1.49156 | |
| 1 | $SiO_2$ | 1.46349 | 104.14 |
| 2 | Si | 3.74413 | 17 |
| 3 | $SiO_2$ | 1.46349 | 75.27 |
| 4 | SiN | 2.01269 | 210.15 |
| 5 | $SiO_2$ | 1.46349 | 540.74 |
| 6 | SiN | 2.01269 | 120.03 |
| 7 | $SiO_2$ | 1.46349 | 325.23 |
| Medium | Air | 1 | |

In another example, an asymmetric laminate structure 300 was used for the substrate 30, where the first glass ply 200 comprised a 3.8 mm thick borosilicate glass sheet (one of the glasses described in PCT Patent Application No. PCT/US2021/61966, filed on Dec. 6, 2021), the interlayer 330 had a 0.1 mm thickness constructed of optically clear adhesive, and the second glass ply 320 was a 0.7 mm thick sheet of aluminosilicate glass. In this example, only a first layered film 36 was included.

Figure 6A:
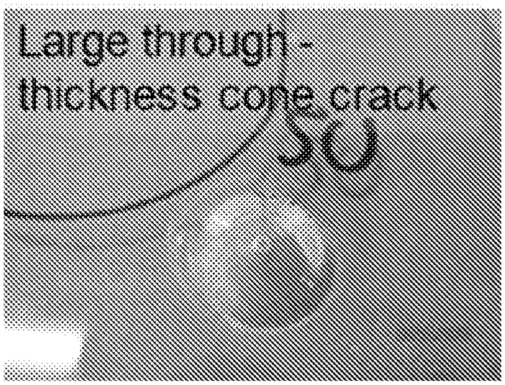
FIG. 6A is an image of a monolithic window constructed of a borosilicate glass after being struck by a ball bearing, according to one or more embodiments of the present disclosure.
Figure 6B:
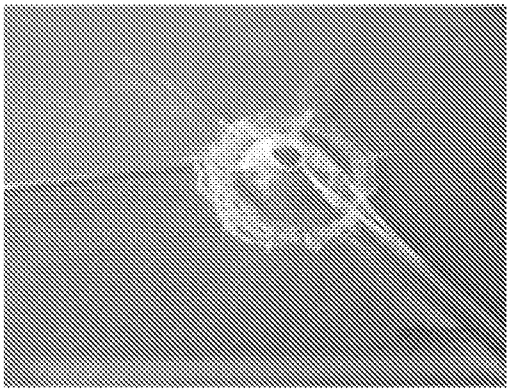
FIG. 6B is an image of an asymmetric laminated window comprising a non-strengthened second glass ply after being struck by a ball bearing, according to one or more embodiments of the present disclosure.
Figure 6C:
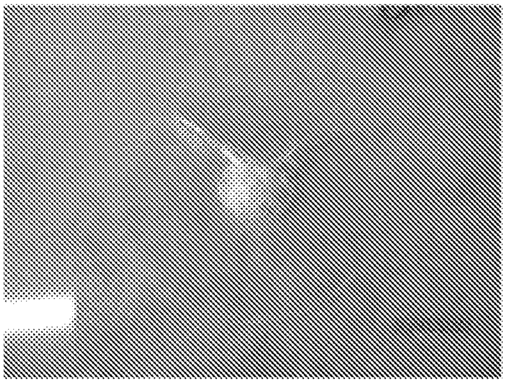
FIG. 6C is an image of an asymmetric laminated window comprising a chemically strengthened second glass ply after being struck by a ball bearing, according to one or more embodiments of the present disclosure.

Ball bearing impact testing was conducted for various laminates that could be used as the substrate 30. A first example substrate was a 5.0 mm thick monolithic layer of an existing borosilicate glass composition. A second example substrate was an asymmetric laminate structure 300 where the first glass ply was a 2.85 mm thick layer of unstrengthened aluminosilicate glass, the interlayer 330 was a 100 μm thick layer of optically clear adhesive, and the second glass ply 320 was a 0.55 mm thick layer of unstrengthened aluminosilicate glass. A third example substrate was an asymmetric laminate structure 300 where the first glass ply was a 2.85 mm thick layer of unstrengthened aluminosilicate glass, the interlayer 330 was a 100 μm thick layer of optically clear adhesive, and the second glass ply 320 was a 1.1 mm thick layer of chemically strengthened aluminosilicate glass. A 1 g ball bearing was projected into the samples at an angle of incidence of 45° on the first glass ply 200 (uncoated in this testing). FIG. 6A depicts the results for an impact at 80.47 km/hr on the first example substrate. As shown, a cone crack that extended through the whole substrate, despite its increased thickness, which would result in a loss of hermeticity. FIG. 6B depicts the results for an impact at 160.93 km/hr on the second example substrate. As shown, a hole was created in the laminate, which would result in a loss of hermeticity. FIG. 6C depicts the results for an impact at 160.93 km/h3 on the third example substrate. As shown, the first glass ply 200 fractured, but the second glass ply 320 remained undamaged, so hermeticity was maintained. These results indicate that the asymmetric laminate structures described herein are capable of providing superior impact performance over monolithic windows, even at smaller overall thicknesses.

Gravelometer tests according to ASTM D3170 were conducted on an asymmetric laminate structure 300 where the first glass ply 200 was a 2.85 mm thick non-strengthened aluminosilicate glass, the interlayer 330 was a 760 μm thick acrylic resin (Uvekol® S15), and the second glass ply 320 was a 0.55 mm thick ion-exchanged strengthened aluminosilicate glass sheet (with low CT—CT10). Hermeticity was maintained after two rounds of multi-impact testing. Pitting and some cracks were observed on the first glass ply 200, but the second glass ply 320 was not damaged so that hermeticity was maintained. Monolithic panels of the same thickness were not able to maintain hermeticity when subjected to similar testing.

Figure 7:
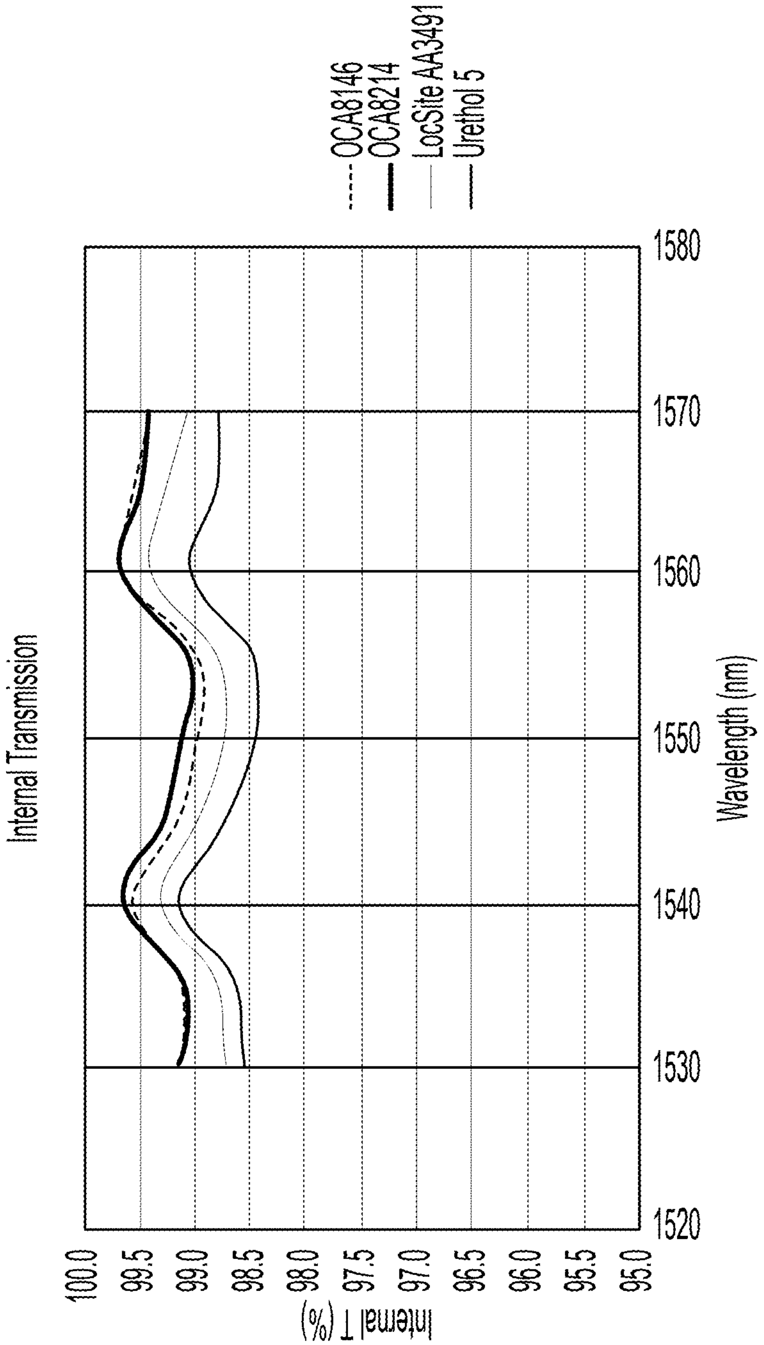
FIG. 7 is a plot of measured optical transmission for a plurality of different interlayers having a 0.1 mm thickness, according to one or more embodiments of the present disclosure.

Light transmission was measured for four candidate materials for the interlayer: (a) 3M™ Optically Clear Adhesive 8146-1; (b) 3M™ Optically Clear Adhesive 8214; (c) Loctite® AA 3491; and (d) Uvekol® S one-component acrylic resin. The results are depicted in FIG. 7. The transmission spectra between 1520 nm and 1580 nm are shown for the interlayers in isolation. The target is greater than or equal to 98% (and preferably greater than 99%), such that the transmission of the laminate (without coatings) is greater than 91% (preferably greater than 92%). As shown, each of the interlayers exhibited a transmittance of greater than or equal to 98% throughout the depicted wavelength range. The optically clear adhesives exhibited greater than 99% at 1550 nm. These results demonstrate that these interlayer materials are suitable in the referenced wavelength range.

An asymmetric laminate structure 300 where the first glass ply 200 was a 2.85 mm thick layer of unstrengthened aluminosilicate glass, the interlayer 330 was 0.1 mm thick, and the second glass ply 320 was a 0.55 mm thick layer of chemically strengthened aluminosilicate glass was constructed with each of the interlayer materials described with respect to FIG. 7. Results are depicted in the Table 4 below. $T_{vis}$, $R_{front}$ (reflectance off the first major surface 202), and $R_{back}$ (reflectance off the fourth major surface 334) are all averages over the wavelength range of 380 nm to 780 nm. $T_{940}$ and $T_{1550}$ are transmissions at the 940 nm and 1550 nm wavelengths, respectively. All values are percentages and were measured at normal incidence.

TABLE 4

| | OCA 8214 | OCA 8146 | Uvikol ® S | Loctite AA3491 |
|---|---|---|---|---|
| $T_{vis}$ | 91 | 91 | 91 | 91 |
| $R_{front}$ | 7.7 | 7.7 | 7.7 | 7.7 |
| $R_{back}$ | 7.7 | 7.7 | 7.7 | 7.7 |
| $T_{940}$ | 91 | 91 | 91 | 91 |
| $T_{1550}$ | 91 | 91 | 90 | 91 |

It is believed that the presence of at least one of the first and second layered films 36 and 38 described herein (such as in the example in the Table 4) will increase the transmittance values by at least 6% and reduce the reflectance values by at least 6% (when including the second layered film 38. As such, the above results indicate that coated laminates in accordance with the present disclosure are capable of exhibiting average transmittances over a 50 nm wavelength range contained in the wavelength range of 800 nm to 1800 nm of at least 95% and an average reflectance in the 50 nm wavelength range of less than 5%.

It will be apparent to those skilled in the art that various modifications and variations can be made without departing from the spirit or scope of the claims.

What is claimed is:

1. A window for a sensing system comprising:

a first glass ply comprising a first major surface, a second major surface that is opposite the first major surface, and a first thickness extending between the first major surface and the second major surface;

a second glass ply comprising a third major surface, a fourth major surface that is opposite the third major surface, and a second thickness extending between the third major surface and the fourth major surface;

an interlayer disposed between the first glass ply and the second glass ply and bonding the second major surface to the third major surface;

and one or more layered films disposed on at least one of the first major surface and the fourth major surface, each of the one or more layered films comprising alternating layers of one or more higher refractive index materials and one or more lower refractive index materials, wherein:

the interlayer, in isolation, comprises an average transmittance of greater than 98% over a 50 nm wavelength range of interest for light normally incident on the fourth major surface or the first major surface, the 50 nm wavelength range of interest is contained in a wavelength range of 800 nm to 1800 nm, the alternating layers of the one or more layered films are configured such that the window exhibits an average transmittance of greater than or equal to 95% over the 50 nm wavelength range of interest for light normally incident on the first major surface or the fourth major surface, the alternating layers of the one or more layered films are configured such that the window exhibits an average reflectance of less than or equal to 5% over the 50 nm wavelength range of interest for light normally incident on the first major surface or the fourth major surface, the first thickness is at least two times greater than the second thickness, and the second glass ply is strengthened to a greater extent than the first glass ply such that the second glass ply exhibits a central tension in a central region thereof that is greater than that of the first glass ply.

2. The window of claim 1, wherein the first glass ply is unstrengthened.

3. The window of claim 1, wherein:

the first thickness is greater than or equal to 2.0 mm and less than or equal to 8.0 mm, and the second thickness is greater than or equal to 0.1 mm and less than or equal to 1.2 mm.

4. The window of claim 1, wherein both the first glass ply and the second glass ply are formed of aluminosilicate glasses.

5. The window of claim 1, wherein the first glass ply is formed from a glass that exhibits anomalous fracturing behavior when subjected to a Vickers indenter test.

6. The window of claim 5, wherein the first glass ply comprises a borosilicate glass composition.

7. The window of claim 6, wherein:

in terms of constituent oxides, the borosilicate glass composition comprises:

$SiO_2$, $B_2O_3$, $Al_2O_3$, one or more alkali metal oxides, and one or more divalent cation oxides selected from the group consisting of MgO, CaO, SrO, BaO, and ZnO, greater than or equal to 11 mol % and less than or equal to 16 mol % $B_2O_3$, greater than or equal to 2 mol % and less than or equal to 6 mol % $Al_2O_3$, and a total amount of $Na_2O$, $K_2O$, MgO, and CaO that is greater than or equal to 7.0 mol %, concentrations in mole percent on an oxide basis of $SiO_2$, $B_2O_3$, the one or more alkali metal oxides, $Al_2O_3$, and the one or more alkaline earth metal oxides, satisfy the relationships:

$$(R_2O + R'O) \geq \text{Al2O3},$$

$$0.80 < (1 - [(2R_2O + 2R'O)/(SiO_2 + 2Al_2O_3 + 2B_2O_3)]) < 0.93,$$

and where $R_2O$ is the sum of the concentrations of the one or more alkali metal oxides and R'O is the sum of the concentrations of the one or more alkaline earth metal oxides.

8. The window of claim 1, wherein the first thickness is at least 3 times greater than the second thickness.

9. The window of claim 1, wherein the second glass ply is chemically strengthened such that the second glass ply comprises a surface compressive stress at the fourth major surface that is greater than or equal to 250 MPa and less than or equal to 900 MPa.

10. The window of claim 9, wherein when the first glass ply is struck by a 1 g ball bearing travelling at 160.93 km/hr, a crack extending through the entire second thickness does not form.

11. The window of claim 1, wherein the interlayer comprises optically clear adhesive or a UV-curable acrylate resin.

12. The window of claim 11, wherein the interlayer comprises a third thickness that is greater than or equal to 0.05 mm and less than or equal to 1.0 mm.

13. The window of claim 1, wherein the 50 nm wavelength range of interest is centered at a wavelength between 900 nm and 950 nm or a wavelength between 1525 nm and 1575 nm.

14. The window of claim 1, wherein:

the one or more layered films comprise a first layered film disposed on the first major surface, and the window comprises a maximum hardness, measured at the first layered film and by the Berkovich Indenter Hardness Test, of at least 8 GPa.

15. The window of claim 14, wherein:

the one or more layered films comprise a second layered film disposed on the fourth major surface, and the quantity, the thicknesses, number, and materials of the alternating layers of the first and second layered films are configured so that the window has:

an average reflectance, calculated over the 50 nm wavelength range of interest between 1400 nm and 1600 nm, of less than 0.5% for light incident on the first surface and the second surface at angles of less than or equal to 15°;

a CIELAB L* value of less than or equal to 45 for angles of incidence of less than or equal to 60° on the first layered film; and CIELAB a* and b* values of greater than or equal to −6.0 and less than or equal to 6.0 when viewed from a side of the first layered film.

16. A window for a sensing system comprising:

a first glass ply comprising a first major surface, a second major surface that is opposite the first major surface, and a first thickness extending between the first major surface and the second major surface;

a second glass ply comprising a third major surface, a fourth major surface that is opposite the third major surface, and a second thickness extending between the third major surface and the fourth major surface;

an interlayer disposed between the first glass ply and the second glass ply and bonding the second major surface to the third major surface;

and one or more layered films disposed on at least one of the first major surface and the fourth major surface, each of the one or more layered films comprising alternating layers of one or more higher refractive index materials and one or more lower refractive index materials, wherein:

the first glass ply, the second glass ply, and the interlayer, in combination, without the one or more layered films, comprise an average transmittance of greater than 90% over a 50 nm wavelength range of interest, the 50 nm wavelength range of interest is contained in a wavelength range of 800 nm to 1800 nm, the alternating layers of the one or more layered films are configured such that the window exhibits an average transmittance of greater than or equal to 95% over the 50 nm wavelength range of interest for light normally incident on the first major surface or the fourth major surface, the alternating layers of the one or more layered films are configured such that the window exhibits an average reflectance of less than or equal to 5% over the 50 nm wavelength range of interest for light normally incident on the first major surface or the fourth major surface, the first thickness is at least two times greater than the second thickness, and the second glass ply is strengthened to a greater extent than the first glass ply such that the second glass ply exhibits a central tension in a central region thereof that is greater than that of the first glass ply.

17. The window of claim 16, wherein both the first glass ply and the second glass ply are formed of aluminosilicate glasses.

18. The window of claim 16, wherein:

the one or more layered films comprise a first layered film disposed on the first major surface, and the window comprises a maximum hardness, measured at the first layered film and by the Berkovich Indenter Hardness Test, of at least 8 GPa.

19. The window of claim 18, wherein:

the one or more layered films comprise a second layered film disposed on the fourth major surface, and the quantity, the thicknesses, number, and materials of the alternating layers of the first and second layered films are configured so that the window has:

an average reflectance, calculated over the 50 nm wavelength range of interest between 1400 nm and 1600 nm, of less than 0.5% for light incident on the first surface and the second surface at angles of less than or equal to 15°;

a CIELAB L* value of less than or equal to 45 for angles of incidence of less than or equal to 60° on the first layered film; and CIELAB a* and b* values of greater than or equal to −6.0 and less than or equal to 6.0 when viewed from a side of the first layered film.

20. A sensor system comprising:

an emitter emitting radiation in a 50 nm wavelength range of interest, the 50 nm wavelength range of interest being contained in the wavelength range from 800 nm to 1800 nm;

a sensor configured to detect the radiation emitted by the emitter;

an enclosure defining a sensor cavity, wherein the emitter and sensor are contained in the sensor cavity, and a window according to claim 16, wherein the window is attached to enclosure to hermetically seal the sensor cavity, wherein:

the second glass ply comprises a dimension that is greater than that of the first glass ply and the second glass ply is attached to the enclosure such that the first major surface lies flush with a front surface of the enclosure, and the sensor cavity remains hermetically sealed after the window is struck with a 1 g ball bearing travelling at 160.9 s km/hr at an angle of incidence of 45°.

* * * * *